(12) United States Patent
Cioc et al.

(10) Patent No.: US 11,378,140 B2
(45) Date of Patent: Jul. 5, 2022

(54) SELECTABLE ONE-WAY CLUTCH WITH SOLENOID ACTUATOR AND PIVOTING ACTUATION MEMBER CONTROLLING ACTIVE STRUT DEPLOYMENT

(71) Applicant: MAGNA POWERTRAIN, INC., Concord (CA)

(72) Inventors: Adrian Cioc, North York (CA); Myron Samila, Toronto (CA); David Dorigo, Oakville (CA)

(73) Assignee: MAGNA POWERTRAIN, INC., Concord (CA)

( * ) Notice: Subject to any disclaimer, the term of this patent is extended or adjusted under 35 U.S.C. 154(b) by 0 days.

(21) Appl. No.: 16/957,751

(22) PCT Filed: Feb. 8, 2019

(86) PCT No.: PCT/CA2019/000017
§ 371 (c)(1),
(2) Date: Jun. 25, 2020

(87) PCT Pub. No.: WO2019/153069
PCT Pub. Date: Aug. 15, 2019

(65) Prior Publication Data
US 2021/0062872 A1 Mar. 4, 2021

Related U.S. Application Data

(60) Provisional application No. 62/629,458, filed on Feb. 12, 2018.

(51) Int. Cl.
| F16D 41/16 | (2006.01) |
| F16D 27/118 | (2006.01) |
| F16D 27/14 | (2006.01) |

(52) U.S. Cl.
CPC .......... *F16D 41/16* (2013.01); *F16D 27/118* (2013.01); *F16D 27/14* (2013.01)

(58) Field of Classification Search
CPC .................................. F16D 41/16; F16D 41/06
See application file for complete search history.

(56) References Cited

U.S. PATENT DOCUMENTS

| 2015/0204392 A1* | 7/2015 | Kimes | F16D 41/02 |
| | | | 192/46 |
| 2016/0160941 A1* | 6/2016 | Green | F16D 41/16 |
| | | | 192/71 |
| 2016/0265609 A1 | 9/2016 | Corsetti et al. | |

(Continued)

FOREIGN PATENT DOCUMENTS

WO WO-2016170426 A1 * 10/2016 ............ F16D 27/118

*Primary Examiner* — Stacey A Fluhart
(74) *Attorney, Agent, or Firm* — Dickinson Wright PLLC

(57) ABSTRACT

A controllable one-way clutch assembly having an actuator module equipped with a solenoid actuator, an active strut moveable in response to energization of the solenoid actuator from a released position to a locked position, a strut spring biasing the active strut toward its released position, and an indirect strut actuation arrangement between the solenoid actuator and the active strut. The indirect strut actuation arrangement includes an intermediate actuation component having a first lug establishing a coupling interface with a translatable plunger of the solenoid actuator and a second lug establishing an engagement interface with the active strut.

19 Claims, 18 Drawing Sheets

(56) References Cited

U.S. PATENT DOCUMENTS

| | | |
|---|---|---|
| 2017/0138414 A1 | 5/2017 | Cioc et al. |
| 2018/0003247 A1 | 1/2018 | Samie et al. |
| 2018/0022201 A1 | 1/2018 | Samila et al. |
| 2018/0340578 A1* | 11/2018 | Hand ...................... F16D 27/09 |
| 2018/0355927 A1* | 12/2018 | Greene ................. F16D 27/108 |
| 2019/0264760 A1* | 8/2019 | Peglowski .............. F16D 41/08 |

* cited by examiner

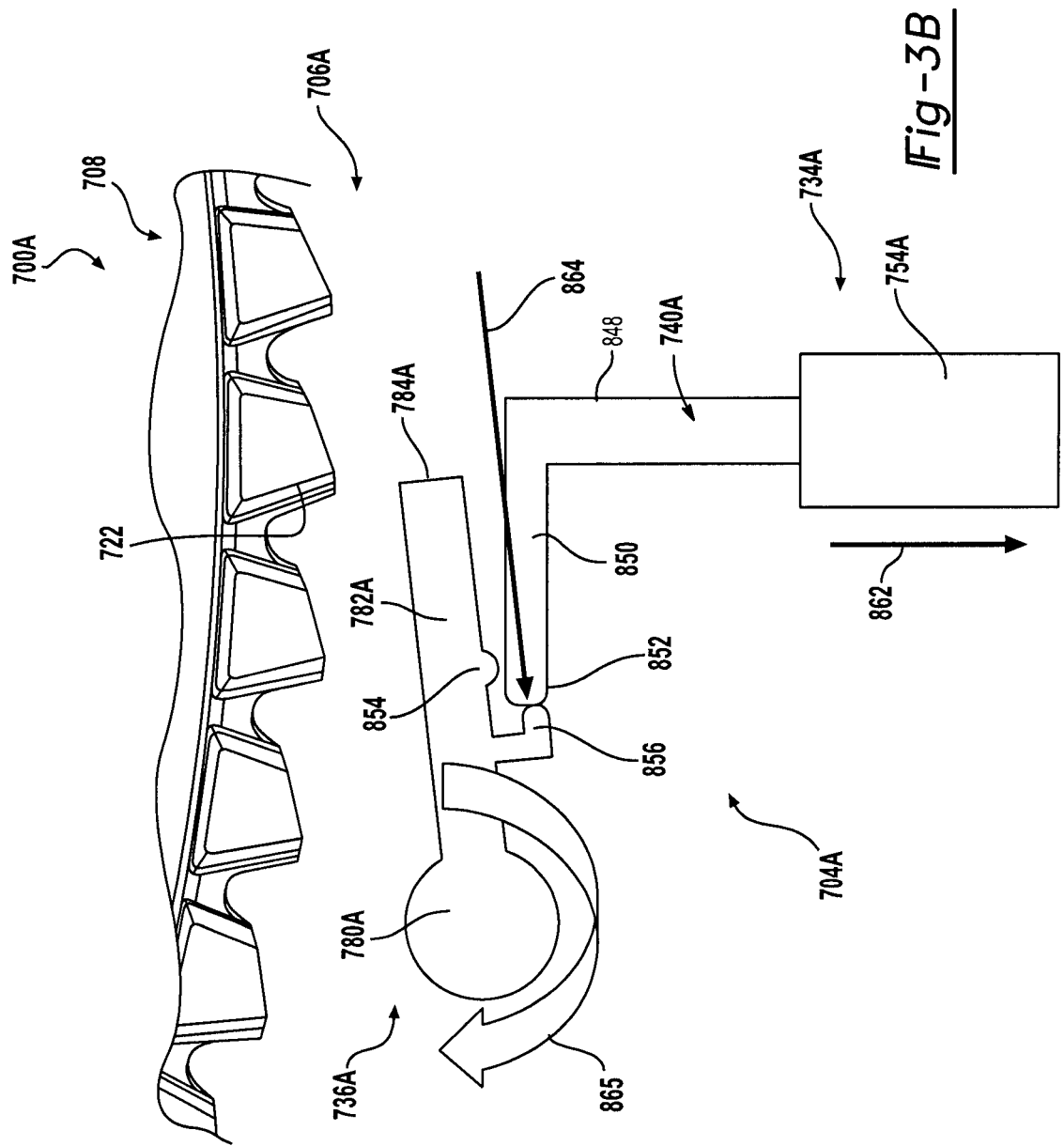

SELECTABLE ONE-WAY CLUTCH WITH SOLENOID ACTUATOR AND PIVOTING ACTUATION MEMBER CONTROLLING ACTIVE STRUT DEPLOYMENT

CROSS-REFERENCE TO RELATED APPLICATIONS

This application is a U.S. National Stage of International Application No. PCT/CA2019/000017, filed on Feb. 8, 2019, which claims the benefit and priority of U.S. Provisional Application No. 62/629,458, filed on Feb. 12, 2018. The entire disclosure of the above applications are incorporated herein by reference.

FIELD OF THE INVENTION

The present disclosure relates generally to controllable overrunning coupling devices. In particular, the present disclosure is directed to a selectable one-way clutch (SOWC) device equipped with an actuator module having an indirect strut actuation mechanism controlling deployment of an active strut in response to actuation of a solenoid-type actuator.

BACKGROUND OF THE INVENTION

This section provides background information related to the present disclosure which is not necessarily prior art.

Automatic transmissions provide a plurality of forward and reverse speed or gear ratios by selectively actuating one or more clutches and/or brakes to establish a torque-transmitting drive connection between a rotary input component and a rotary output component for supplying motive power (i.e., drive torque) from a powertrain to a driveline in a motor vehicle. One type of brake or clutch widely used in automatic transmissions is an overrunning coupling device, commonly referred to as a one-way clutch (OWC). The one-way clutch operates in a freewheeling mode when a first race (in radial coupling configuration) or drive plates (in axial coupling configurations) rotates in a first (i.e., freewheel) direction relative to a second race or drive plate. In contrast, the one-way clutch operates in a locked mode when the first race or drive plate attempts to rotate in a second (i.e. lockup) direction relative to the second race or drive plate. Typically, a locking member, such as a strut, associated with the one-way clutch is moveable between a non-deployed position to establish the freewheeling mode and a deployed position to establish the locked mode. The strut is commonly biased by a strut spring toward one of its two distinct positions. Such conventional one-way clutches provide no independent control over their modes of operation, that is to say whether they lockup or freewheel in both directions, and are commonly referred to as "passive" one-way clutches. Thus, basic passive one-way clutches provide the locked mode in one rotary direction and the freewheeling mode in the opposite direction based on the direction that the drive torque is being applied to the first race or drive plate.

There are however, requirements in modern automatic transmissions where a "controllable" overrunning coupling device, commonly referred to as either a selectable one-way clutch (SOWC), can be controlled to provide additional functional modes of operation. Specifically, a controllable one-way clutch may further be capable of providing a freewheeling mode in both rotary directions until a command signal (i.e., from the transmission controller) actuates a power-operated actuator for shifting the coupling device from its freewheeling mode into its locked mode by causing the strut to move from its non-deployed position into its deployed position. Thus, a controllable one-way clutch may be capable of providing a drive connection between an input member and an output member in one or both rotational directions and it may also be operable to freewheel in one or both directions. It is known in modern automatic transmissions to integrate a passive one-way clutch and a controllable one-way clutch into a combined coupling device, commonly referred to as a bi-directional clutch assembly. It is also known to integrate a pair of controllable one-way clutches into a combined coupling device, commonly referred to as a controllable bi-directional clutch assembly, for providing the additional capability of establishing freewheeling and locked modes in both rotary directions.

The controllable one-way clutch may utilize a hydraulic actuator to selectively shift between the available operating modes. Examples of conventional controllable one-way clutches that are hydraulically-actuated are disclosed in U.S. Pat. Nos. 6,290,044, 8,079,453 and 8,491,439. It is also known to use an electromechanical actuator with the some controllable one-way clutches, one example of which is disclosed in U.S. Pat. No. 8,196,724. As a further alternative, development has recently been directed to electromagnetic actuators for use with controllable one-way clutches, examples of which are disclosed in U.S. Pat. Nos. 8,276,725 and 8,418,825. In controllable one-way clutches equipped with an electromagnetic actuator, a rocker-type strut is pivoted from its non-deployed position to its deployed position in response to energization of a coil assembly. In some such controllable one-way clutches, a "direct" strut actuation arrangement is configured with the strut as part of the magnetic circuit such that pivotal movement from its non-deployed position to its deployed position is caused by an attraction force applied directly to the strut via energization of the coil assembly. Therefore, precise control of the air gap established between a core/pole piece of the coil assembly and the magnetic strut is required to provide robust and reliable lockup functionality. As an alternative, some other controllable one-way clutches are equipped with an electromagnetic actuator having an "indirect" strut actuation arrangement in which a magnetic intermediate component, such as an armature, is part of the magnetic circuit and is arranged to cause pivotal movement of the non-magnetic strut in response to energization of the coil assembly.

As an alternative to conventional electromagnetic actuators, controllable one-way clutches are now being developed which are equipped with a solenoid actuator having a linearly-moveable actuation component, commonly referred to as a plunger, that is operable in cooperation with either a direct or an indirect strut actuation arrangement to control pivotal movement of the strut between its non-deployed and deployed positions in response to translational movement of the plunger between retracted and extended positions. In direct strut actuation arrangements, the plunger acts directly on the strut such that translational movement of the plunger in response to energization of the solenoid actuator results in concomitant pivotal movement of the strut. Alternatively, in indirect strut actuation arrangements, an intermediate actuation component is moved in response to translation of the plunger for causing corresponding pivotal movement of the strut.

There are certain shortcomings associated with both direct and indirect strut actuation arrangements when used in conjunction with a solenoid actuator. For example, in direct strut actuation arrangements, the solenoid actuator must be precisely mounted with respect to the strut since a tip portion of the plunger must be accurately aligned and oriented relative to a pivot cam portion of the strut. Engagement of the tip portion of the plunger with the pivot cam portion of the strut functions to convert translational movement of the plunger into pivotal movement of the strut. In addition, a compromise may be required between the actuation force generated by the solenoid actuator and applied via the plunger to the strut and the magnitude of the biasing force associated with the strut return spring. While indirect-acting strut actuation arrangements are intended to provide increased mechanical advantage and reduce system friction, the integration of the intermediate actuation component may introduce increased component cost, assembly complexity and packaging requirements into the actuator module. Furthermore, the plunger is typically aligned to translate along a plane that is generally orthogonally oriented with respect to the pivot axis of the strut. This transverse configuration requires additional radial space surrounding the controllable one-way clutch be provided within the transmission housing to accommodate mounting of the solenoid actuator. Additionally, this generally orthogonal relationship between the plunger's line of motion and the pivot axis of the strut results in increase frictional loading on the strut.

While traditional controllable one-way clutches used in motor vehicle applications are adequate to meet all requirements, a need exists to continue development of improved power-operated actuators and strut actuation arrangements for use in controllable one-way clutches that address and overcome shortcomings, such as those noted above.

SUMMARY OF THE INVENTION

This section provides a general summary of the disclosure and is not intended to be considered a comprehensive listing of all of its aspects, features and objectives.

It is an aspect of the present disclosure to provide a controllable one-way clutch adapted for use in a power transmission device.

It is a related aspect to provide an actuator module for use with the controllable one-way clutch having an indirect strut actuation arrangement provided between a linearly-moveable actuation member associated with a power-operated actuator and a pivotably-moveable strut.

It is another related aspect to provide a controllable one-way clutch comprised of a clutch module and an actuator module. The actuator module is mounted to a first clutch member of the clutch module and includes a solenoid actuator having an energizable coil assembly and a linearly-moveable actuation member, a pivotable strut, a strut biasing arrangement, and an indirect strut actuation arrangement disposed between the actuation member and the strut. The indirect strut actuation arrangement is configured to cause the strut to pivot between a released (i.e. non-deployed) position and a locked (i.e. deployed) position relative to ratchet teeth formed on a second clutch member associated with the clutch module in response to translation of the actuation member between a first position and a second positions. The strut biasing arrangement is operable to normally bias the strut toward its non-deployable position.

It is another aspect of the present disclosure to orient the actuator module such that the linearly-moveable actuation member of the solenoid actuator moves along a line of action that is generally parallel to a pivot axis of the strut.

It is yet another aspect of the present disclosure to configure the indirect strut actuation arrangement to include an intermediate actuation component having a coupling interface operably coupled to the linearly-moveable actuation member of the solenoid actuator and an engagement interface operably engaged with the strut. Pivotal movement of the intermediate actuation component between a non-actuated position and an actuated position in response to translational movement of the actuation member of the solenoid actuator between its first and second positions results in corresponding pivotal movement of the strut between its non-deployed and deployed position.

In accordance with these and other aspect, the present disclosure is directed to a controllable one-way coupling device comprising: a clutch module having a first clutch component, and a second clutch component arranged for rotation relative to the first clutch component and having ratchet teeth; and an actuator module mounted to the first clutch component and having a solenoid actuator with a plunger that is linearly-moveable between first and second positions, a strut pivotably-moveable between a non-deployed position disengaged from the ratchet teeth and a deployed position engaged with the ratchet teeth, a strut biasing member for biasing the strut toward its non-deployed position, and an intermediate actuation component that is pivotably-moveable between a non-actuated position and an actuated position; The intermediate actuation component having a first lug segment defining a coupling interface with the plunger and a second lug segment defining an engagement interface with the strut. Movement of the plunger from its first position to it second position in response to actuation of the solenoid actuator causes the intermediate actuation component to move from its non-actuated position to its actuated position which causes the strut to concomitantly move from its non-deployed position into its deployed position.

Further areas of applicability of the present disclosure will become apparent from the detailed description, drawings and specific example provided hereinafter. It should be understood that the detailed description, drawings and specific examples, while indicating preferred embodiments of the present disclosure, are intended for purposes of illustration only and are not intended to limit the scope of the invention.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 3A illustrates an alternative embodiment of an actuator module for a controllable one-way clutch including a direct strut actuation arrangement with strut shown located in a locked/deployed position while FIG. 3B illustrates this same arrangement with the strut shown located into a released/non-deployed position;

DESCRIPTION OF THE ENABLING EMBODIMENTS

Example embodiments will now be described more fully with reference to the accompanying drawings. In general, each embodiment is directed to a overrunning coupling device having at least a controllable one-way locking device (i.e. brake and/or clutch) including a moveable locking component (i.e. strut) that is controlled via an electromagnetic actuator. Thus, the controllable one-way locking device transmits torque mechanically but is actuated via an electrical actuation system. However, these example embodiments only are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
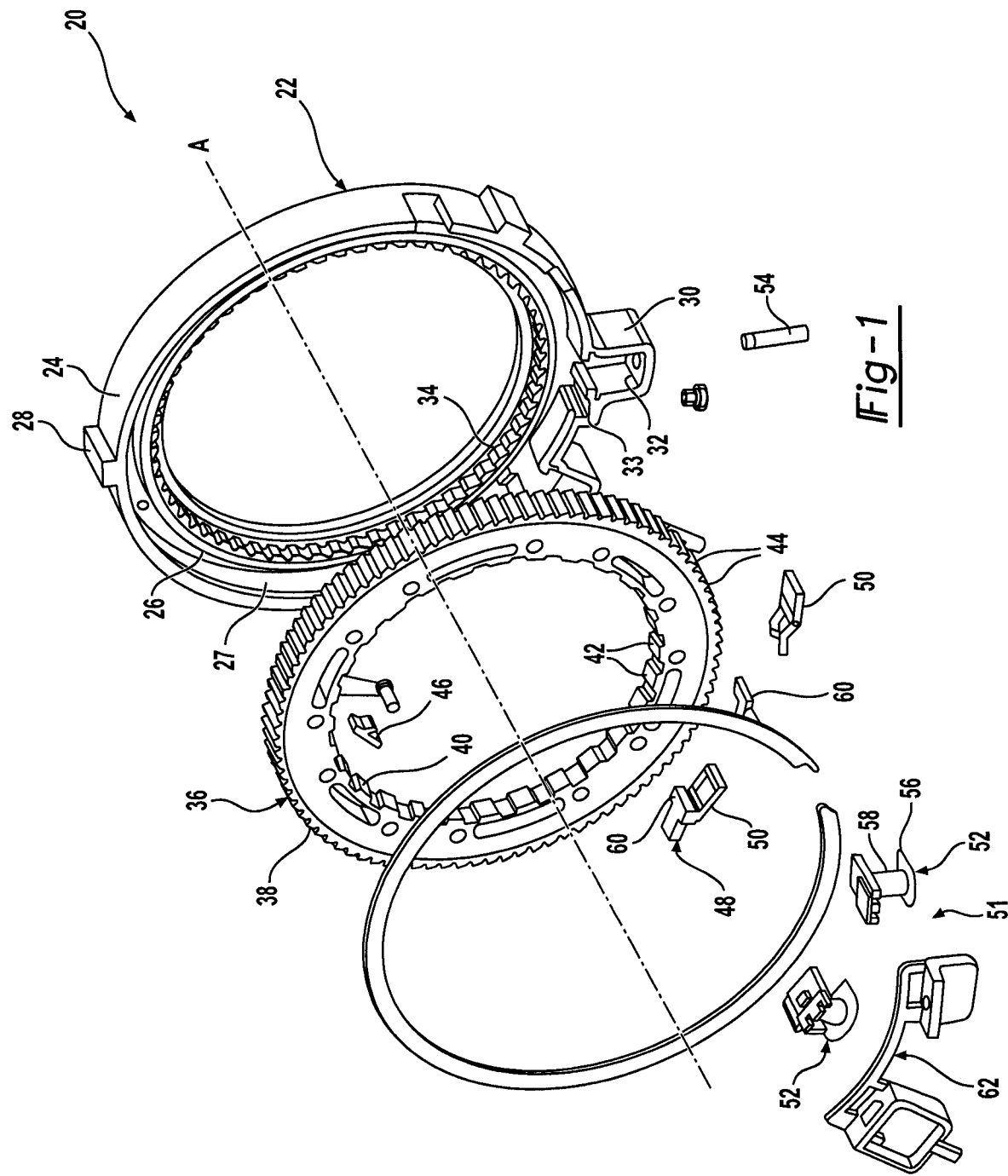
FIG. 1 is an exploded isometric view of bi-directional clutch assembly configured to include a passive one-way clutch and a controllable one-way clutch having an actuator module with an indirect strut actuation arrangement.

Referring to FIG. 1, an example embodiment of a bi-directional clutch assembly 20 is generally shown in an exploded view. Bi-directional clutch assembly 20 is of a type adapted, for example, for installation in an automatic transmission. Clutch assembly 20 includes a "controllable" overrunning coupling device, commonly referred to as either a selectable one-way clutch (SOWC) or an electrically-controlled one-way clutch (EOWC). For purposes of this application, the term "clutch assembly" should be interpreted to include couplings, clutches and brakes wherein one component is drivingly connected to a torque delivery component of a power transmission assembly (i.e. the transmission) while the other component is drivingly connected to another torque delivery component or is non-rotatably fixed to a housing or other stationary component.

Bi-directional clutch assembly 20 is shown in this non-limiting embodiment to generally include a clutch module having a first clutch member and a second clutch member, a passive one-way clutch having a plurality of passive struts, and a controllable one-way clutch having at least one active strut assembly and at least one power-operated actuator, cumulatively defining an actuator module. Clutch 20 module is shown to include of an outer race 22 and an inner race 36. Outer race 22 includes an outer ring segment 24 and an inner ring segment 26 that are spaced radially from one another and interconnected via a radial web segment 27. Outer ring segment 24 includes a plurality of outer lugs 28 that extend radially outwardly for mating engagement with a first component. The first component can be a stationary component (such as a housing of the transmission) or a rotary component (such as a shaft). Outer ring segment 24 further includes a pair of protrusions 30 that extend radially outwardly. Each of protrusions 30 defines a radially-extending actuator pocket 32 and a strut pocket 33. It should be appreciated that more or fewer protrusions 30 could be utilized and that they may be formed integrally with outer race 22 or rigidly secured thereto. Inner ring segment 26 includes a plurality of inner ramp surfaces, hereinafter referred to as inner ratchet teeth 34, which extend radially inwardly and are evenly distributed about the axis A.

Inner race 36 includes an outer rim segment 38 and an inner rim segment 40 that are spaced radially from one another. Outer rim segment 38 is disposed radially between outer and inner ring segments 24, 26 of outer race 22, and inner rim segment 40 is disposed radially inwardly from inner ring segment 26 of outer race 22. Inner rim segment 40 of inner race 36 includes a plurality of inner lugs 42 that extend radially inwardly for mating with a second component (typically a rotary component). Commonly, inner lugs 42 interconnect a shaft or clutch plates for rotation with inner race 36. Further, outer rim segment 38 of inner race 36 includes a plurality of outer ramp surfaces, hereinafter referred to as outer ratchet teeth 44, that extend radially outwardly and are evenly distributed about the axis A.

The passive one-way clutch includes a plurality of passive locking elements, hereinafter referred to as passive struts 46, that are supported in strut apertures formed in inner race 36 for pivotal movement between a locking (deployed) position and an unlocking (non-deployed) position. In the locking position, at least one of passive struts 46 engages one of inner ratchet teeth 34 on outer race 22 for coupling outer and inner races 22, 36 to one another during counter-clockwise rotation of inner race 36 relative to outer race 22. Therefore, engagement by one or more of passive struts 46 prevents relative rotation of outer and inner races 22, 36 in the counter-clockwise direction. However, passive struts 46 still allow relative rotation, i.e., overrun, in the clockwise direction when located in the locked position since they are permitted to ratchet over the ramped profile of inner ratchet teeth 34. In the unlocking position, passive struts 46 are radially spaced from inner ratchet teeth 34 of outer race 22, thereby also allowing counter-clockwise rotation of inner race 36 relative to outer race 22. While not specifically shown, passive strut springs are provided to normally bias passive struts 46 toward one of the locking and unlocking positions.

In association with the controllable one-way clutch, the actuator module includes a pair of active strut assemblies 48 and a pair of electromagnetic actuators 51. Each active strut assembly 48 is disposed within a corresponding one of strut pockets 33 formed in outer ring segment 24. Each active strut assemblies 48 includes an active locking element, hereinafter referred to as an active strut 50, that is selectively pivotably moveable between a locked (deployed) and an unlocked (non-deployed) position. In the locked position, active strut 50 lockingly engages one of outer ratchet teeth 44 of inner race 36, thereby locking the outer and inner races to one another during clockwise movement of inner race 22 relative to outer race 22. However, active strut 50 still allows relative displacement, i.e., overrun, in the counter-clockwise direction. In the unlocked position, active strut 50 is radially spaced from outer ratchet teeth 44, thereby allowing inner and outer races 22, 36 to rotate relative to one another in both directions. Furthermore, each one of active strut assemblies 48, in this non-limiting example, includes an armature 60 that is disposed adjacent to a corresponding active strut 50 for controlling the pivotal movement of active strut 50 in response to actuation of electromagnetic actuator 51. Thus, active strut assemblies 48 define an "indirect" strut actuation arrangement. However, active strut assemblies 48 can alternatively be configured in a "direct" strut actuation arrangement without armature 60 such that electromagnetic actuators 51 would directly controls movement of active struts 50, such as in the controllable one-way clutch embodiment shown in FIG. 2.

As noted, the actuator module associated with the controllable one-way clutch is shown to include a pair of electromagnetic actuators 51. Each electromagnetic actuator 51 is configured to have a "line of action" aligned to be oriented transversely to the pivot axis of active struts 50. FIG. 1 shows each electromagnetic actuator 51 to include a coil assembly 52 mounted in actuator pocket 32 and being radially spaced from active strut 50 and armature 60. Coil assembly 52 includes a core 54 of a magnetically permeable material, a bobbin 56 disposed about core 54, and a wire coil 58 wrapped about bobbin 56. Furthermore, armature 60 is disposed between active strut 50 and coil 58 for pivoting toward core 54 in response to energization of coil 58 and thus causing pivotal movement of active strut 50. Armature 60 is made of a magnetic material so as to be magnetically attracted to core 54 upon energization of coil 58. However, armature 60 can alternatively be a non-magnetized component in indirect strut actuation arrangements whereat armature 60 will be mechanically-coupled to a moveable component (i.e. plunger) in solenoid-type electromagnetic actuators 51.

In a preferred but non-limiting arrangement, when voltage and/or current are applied to coils 58, coils 58 become an electromagnet producing an electric field (or flux). The flux flows outwards in all directions and transfers through the small air gap between armature 60 and core 54 in the center of coil assembly 52. Core 54 becomes magnetized, therefore attracting armature 60 towards core 54. The resulting pivotal motion of armature 60 forces active strut 50 to mechanically deploy due to the mechanical linkage between active strut 50 and armature 60. Upon deployment, active strut 50 moves from its unlocked position to its locked position whereat it locates itself against one of outer ratchet teeth 44 of inner race 36, effectively locking inner race 36 from rotating in that direction. Disengagement occurs as voltage and/or current is removed from coil assembly 52, wherein armature 60 is demagnetized and free from coil assembly 52. A biasing member, such as an active strut spring (not shown), is positioned between active strut 50 and outer race 22 and causes active strut 50 to move back to its unlocked position during disengagement.

It should be appreciated that the arrangement of armature 60, active strut 50, and coil assembly 52 can act to apply a locking force in a radial direction (as shown in FIG. 1) or an axial direction, depending on the layout and/or requirements of clutch assembly 20. Radially stacked clutch assembly 20 offers packaging advantages over its axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

A lead frame 62 is attached to each of electromagnetic actuators 51 for electrically connecting coils 58 to one another for coordinated energization of coils 58. It should be appreciated that lead frame 62 could connect any number of coils 58. A printed circuit board (PCB) is attached to lead frame 62 for selectively controlling the energization of coils 58. The printed circuit board is disposed radially and axially adjacent to one of coils 58. Lead frame 62 further includes at least one power output contact that is disposed radially and axially adjacent to each of coils 58 for electrically connecting to coils 58 to provide power to coils 58. Any number of power contacts could be utilized to power any number of coils 58. Lead frame 62 also includes a wire harness that extends from the printed circuit board for connecting to a suitable controller, such as a transmission control module (TCM) or a powertrain control module (PCM), for transmitting data to the circuit board and to power the circuit board. Additionally, lead frame 62 includes a plastic encapsulation or casing that is disposed about the printed circuit board and the wires for protecting the printed circuit board and the wires for allowing lead frame 62 to be submerged in Automatic Transmission Fluid and operate in −40 C to +140 C temperatures. It should be appreciated that the aforementioned configuration of lead frame 62 and associated components provide a low-cost, modular solution that provides for a more simplified manufacturing process.

Figure 2:
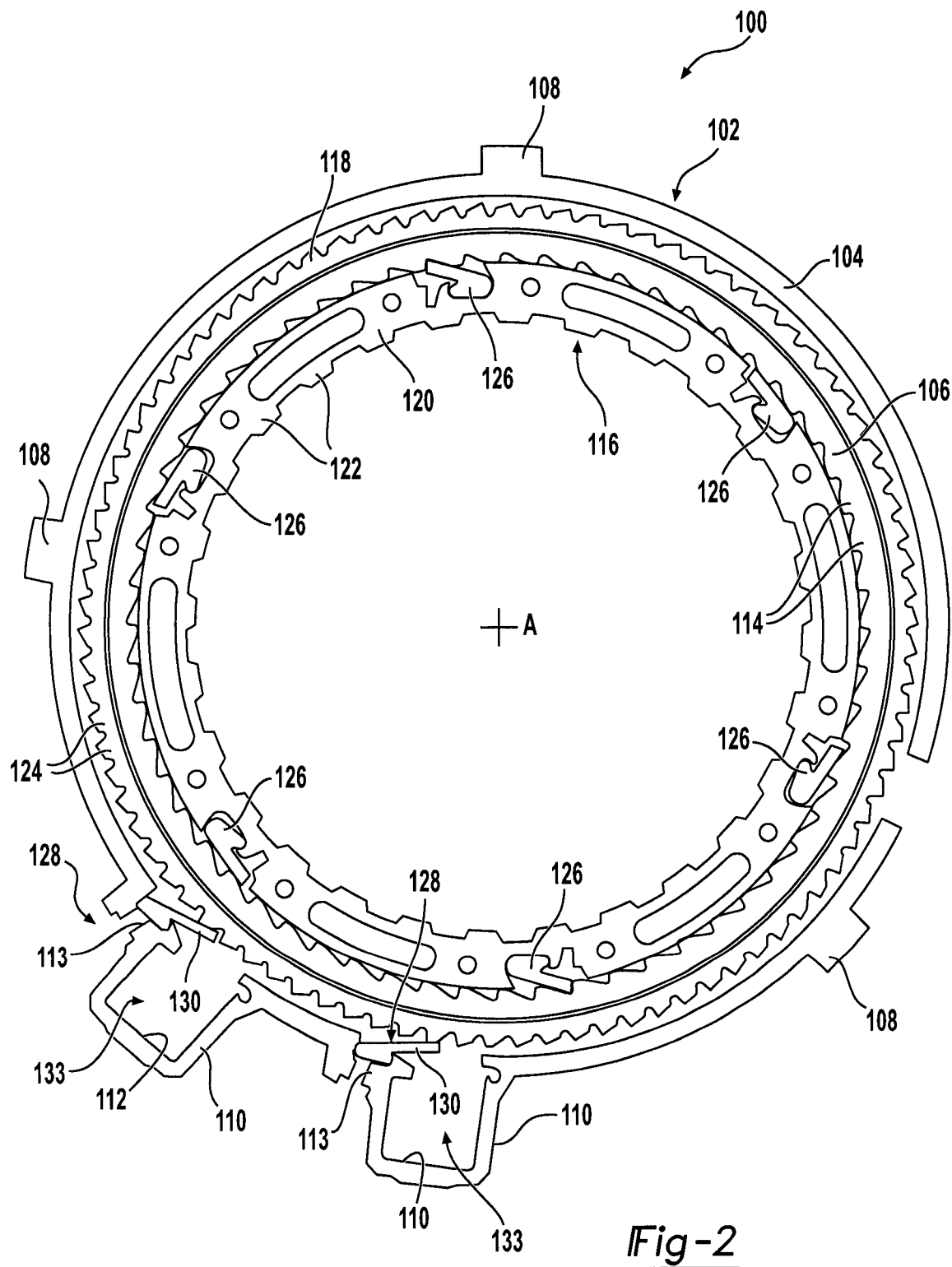
FIG. 2 is a sectional view of another bi-directional clutch assembly including a passive one-way clutch and a controllable one-way clutch having an actuator module with a direct strut actuation arrangement.

Referring now to FIG. 2, a modified version of bi-directional clutch assembly 20 of FIG. 1 is now identified by reference numeral 100. Generally speaking, bi-directional clutch assembly 100 again includes a clutch module and at least one actuator module. However, in this embodiment, a "direct" strut actuation arrangement is provided between the power-operated actuator and the active strut. The clutch module includes an outer race 102 that extends annularly about an axis A. Outer race 102 includes an outer ring segment 104 and an inner ring segment 106 that are spaced radially from one another. Outer ring segment 104 includes a plurality of outer lugs 108 that extend radially outwardly for mating with a first component. The first component can be a stationary component (such as a housing of the transmission) or a rotary component (such as a shaft). Outer ring segment 104 further includes a pair of protrusions 110 that extend radially outwardly. Each of protrusions 110 defines a radially extending actuator pocket 112 and a strut pocket 113. It should be appreciated that more or fewer protrusions 110 could be utilized. Inner ring segment 106 presents a plurality of ramped inner ratchet teeth 114 that extend radially inwardly and are evenly distributed about the axis A.

The clutch module of clutch assembly 100 further includes an inner race 116 that also extends annularly about the axis A. Inner race 116 has an outer rim segment 118 and an inner rim segment 120 that are spaced radially from one another. Outer rim segment 118 is disposed radially between outer and inner ring segments 104, 106 of outer race 102 while inner rim segment 120 is disposed radially inwardly from inner ring segment 106 of outer race 102. Inner rim segment 120 of inner race 116 includes a plurality of inner lugs 122 that extend radially inwardly therefrom for mating with a second component (typically a rotary component). Further, outer rim segment 118 of inner race 116 includes a plurality of ramped ratchet teeth 124 that extend radially outwardly and are evenly distributed about the axis A.

The passive one-way clutch associated with bi-directional clutch assembly 100 includes six passive struts 126 that are pivotably supported by inner race 116. It should be appreciated that more or fewer passive struts 126 could alternatively be utilized. Passive struts 126 are moveable for engaging inner ratchet teeth 114 on inner ring segment 106 of outer race 102 for preventing relative displacement of inner and outer races 116, 102 in the counter-clockwise direction. However, passive struts 126 allow relative displacement i.e., overrun, between inner and outer races 116, 102 in the clockwise direction.

In the controllable one-way clutch associated with bi-directional clutch assembly 100, each actuator module includes an active strut assembly 128 and an electromagnetic actuator 133. Each active strut assembly 128 is received in a corresponding one of strut pockets 113 on outer ring segment 104. Each active strut assembly 128 includes an active strut 130 that is selectively pivotably moveable between a locked (deployed) and an unlocked (non-deployed) position. In the locked position, active struts 130 engage ratchet teeth 124 on inner race 116 to prevent relative displacement of inner and outer races 102, 116 in the clockwise direction. However, active struts 130 allow relative displacement in the counter-clockwise direction. In the unlocked position, active struts 130 are radially spaced from ratchet teeth 124, thereby allowing inner and outer races 116, 102 to rotate relative to one another.

As noted, the actuator modules of the controllable one-way clutch associated with clutch assembly 100 also includes electromagnetic actuators 133. Each electromagnetic actuator 133, only shown schematically, is generally similar to electromagnetic actuator 51 in that its "line of action" is aligned to be oriented transversely relative to the pivot axis of strut 130. Each electromagnetic actuator 133 includes a coil assembly 52 that is radially spaced from active strut 130. Coil assembly 52 includes core 54 of magnetically permeable material, bobbin 56 disposed about core 54, and coil 58 wrapped about bobbin 56. Active strut 130 is made of a magnetic material and located adjacent to coil 58 for pivoting toward core 54 and thus providing the pivotal movement of active strut 130 in response to energization of coil 58.

The combination of passive and active struts 126, 130 provide for a bi-directional configuration of clutch assembly 100 that allows engagement in two opposite directions (clockwise and counter-clockwise). It should be appreciated that this concept is also applicable in axially oriented configurations.

Figure 3:
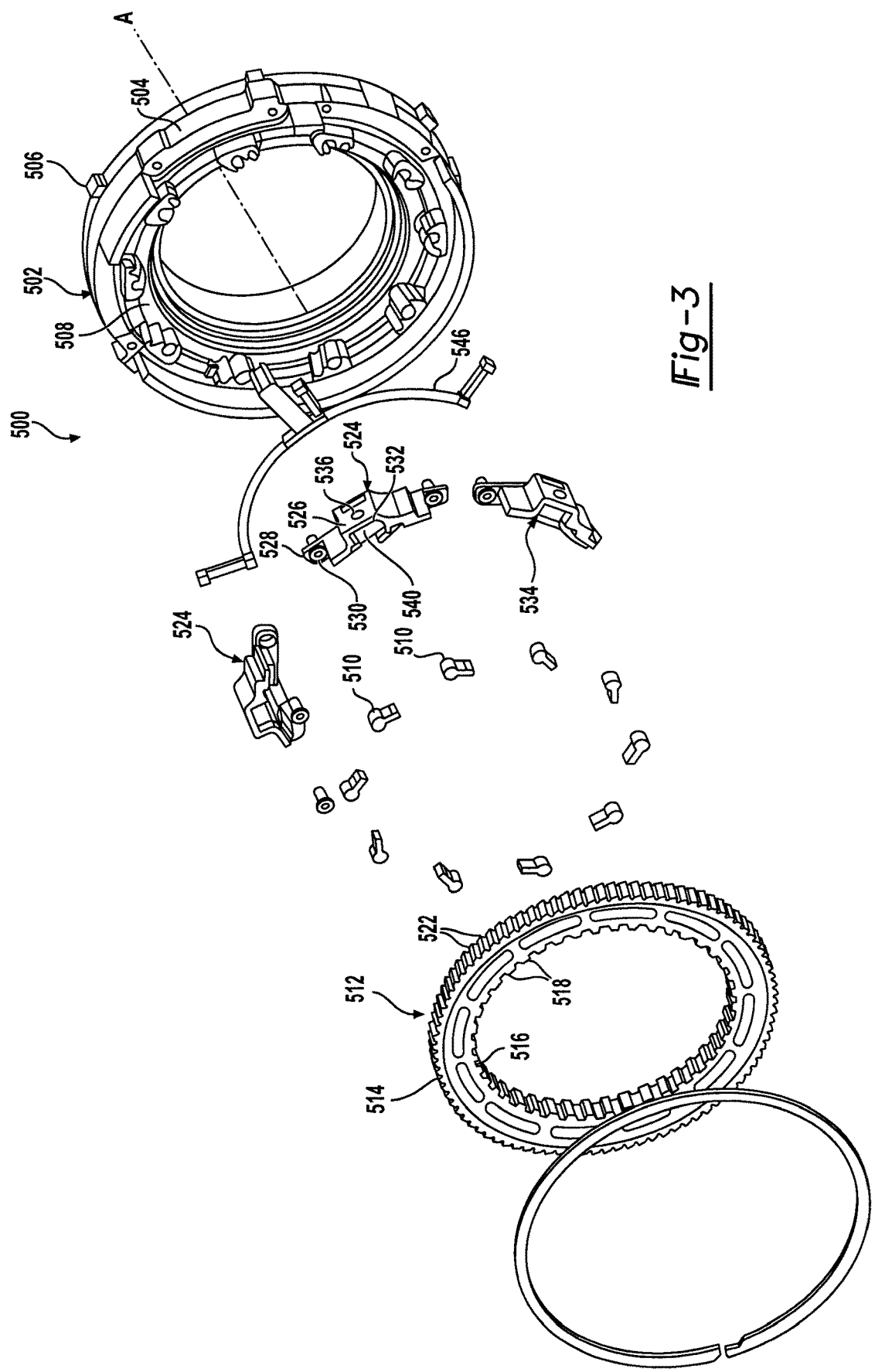
FIG. 3 is an exploded isometric view of another bi-directional clutch assembly equipped with a passive one-way clutch and a controllable one-way clutch having an actuator module with a direct strut actuation arrangement.

Referring now to FIG. 3, another non-limiting embodiment of a bi-directional clutch assembly 500 is generally shown to include a clutch module, a passive one-way clutch, and a controllable one-way clutch. The clutch module includes an outer race 502 and an inner race 512. Outer race 502 extends annularly about an axis A. Outer race 502 includes an outer ring segment 504 having a plurality of outer lugs 506 that extend radially outwardly for mating with a first component. The first component can be a stationary component (such as a housing of the transmission) or a rotary component (such as a shaft). Outer race 502 further has an axial face 508 with an annular shape that extends radially inwardly from outer ring segment 504. A plurality of passive struts 510 are pivotally connected to axial face 508. A passive strut biasing spring (not shown) engages each of passive struts 510 for normally biasing passive struts 510 toward a locked position relative to inner race 512.

Inner race 512 extends annularly about the axis A. Inner race 512 has an outer band segment 514 and an inner band segment 516 that are spaced radially from one another on opposing sides of passive struts 510. Inner band segment 516 of inner race 512 includes a plurality of inner lugs 518 that extend radially inwardly therefrom for mating with a second component (typically a rotary component). Inner band segment 516 of inner race 512 further includes a plurality of passive ratchet teeth 520 that extend radially outwardly therefrom for being selectively engaged by passive struts 510 for locking inner and outer races 512, 502 to one another in response to counter-clockwise rotation of inner race 512 relative to outer race 502. Outer band segment 514 of inner race 512 includes a plurality of active ratchet teeth 522 that extend radially outwardly therefrom and are evenly distributed about the axis A.

The plurality of passive struts 510 are pivotable between a locking position and an unlocking position. In the locking position, passive struts 510 engage passive ratchet teeth 520 of outer race 502 for connecting outer and inner races 502, 512 to one another during counter-clockwise rotation of inner race 512 relative to outer race 502. Therefore, engagement by passive struts 510 prevents relative displacement of outer and inner races 502, 512 in the counter-clockwise direction. However, passive struts 510 allow relative displacement, i.e., overrun, in the clockwise direction. In the unlocking position, passive struts 510 are radially space from passive ratchet teeth 520 of outer race 502, thereby allowing counter-clockwise rotation of inner race 512 relative to outer race 502.

A plurality of actuator modules 524 are axially connected to outer race 502. Each actuator modules 524 includes a housing that is generally arc-shaped and has a base 526 and a pair of flanges 528 that extend from opposite sides of base 526. Each actuator module 524 also includes an active strut assembly and an electromagnetic actuator which are configured to provide a "direct" strut actuation configuration. A fastener 530, e.g., a bolt, extends through each of flanges 528 and is connected to outer race 502 for securing the housings of electromagnetic actuator modules 524 to outer race 502. Actuator modules 524 are arranged in circumferential alignment with one another about the axis A.

A coil pocket 532 extends axially into base 526. A coil assembly 534 associated with the electromagnetic actuator is received in coil pockets 532. Coil assembly 534 includes a core 536 of a magnetically permeable material, a bobbin 538 disposed about core 536, a coil 540 wrapped about bobbin 538, and a linearly-moveable actuation component (i.e. "plunger"). It should be appreciated that the coil assemblies 534 can advantageously be easily fitted into the pocket for easy installation.

Each active strut assembly includes an active strut 542 that is selectively pivotably moveable relative to the housing of actuator module 524 between a locked (deployed) position and an unlocked (non-deployed) position. In the locked position, active struts 542 engage active ratchet teeth 522 of inner race 512, thereby locking outer and inner races 502, 512 to one another during clockwise movement of inner race 512 relative to the outer race 502. However, active struts 542 allow relative displacement, i.e., overrun, in the counter-clockwise direction. In the unlocked position, active struts 542 are radially spaced from active ratchet teeth 522, thereby allowing inner and outer races 512, 502 to rotate relative to one another. An active strut spring (not shown) is also associated with each active strut assembly and is configured to normally bias active strut 542 toward its unlocked position. In operation, energization of coil assembly 534 causes the plunger to move from a retracted position to an extended position for forcibly driving active strut 542 to move from its unlocked position into its locked position. Upon power being turned off, the plunger moves back to its retracted position which, in turn, permits the active strut spring to forcibly drive active strut 542 back to its unlocked position.

Accordingly, it should be appreciated that the modular configuration of actuator modules 524 allows the active strut assemblies and electromagnetic actuator to be manufactured and assembled separately from the rest of clutch assembly 500. Further, it should be appreciated that any number of actuator modules 524 could be installed on any given clutch assembly 500 as needed to provide a needed amount of torque. Additionally, it should be appreciated that actuator modules 524 as described herein could be utilized on various other clutch assembly configurations.

Figure 3A:
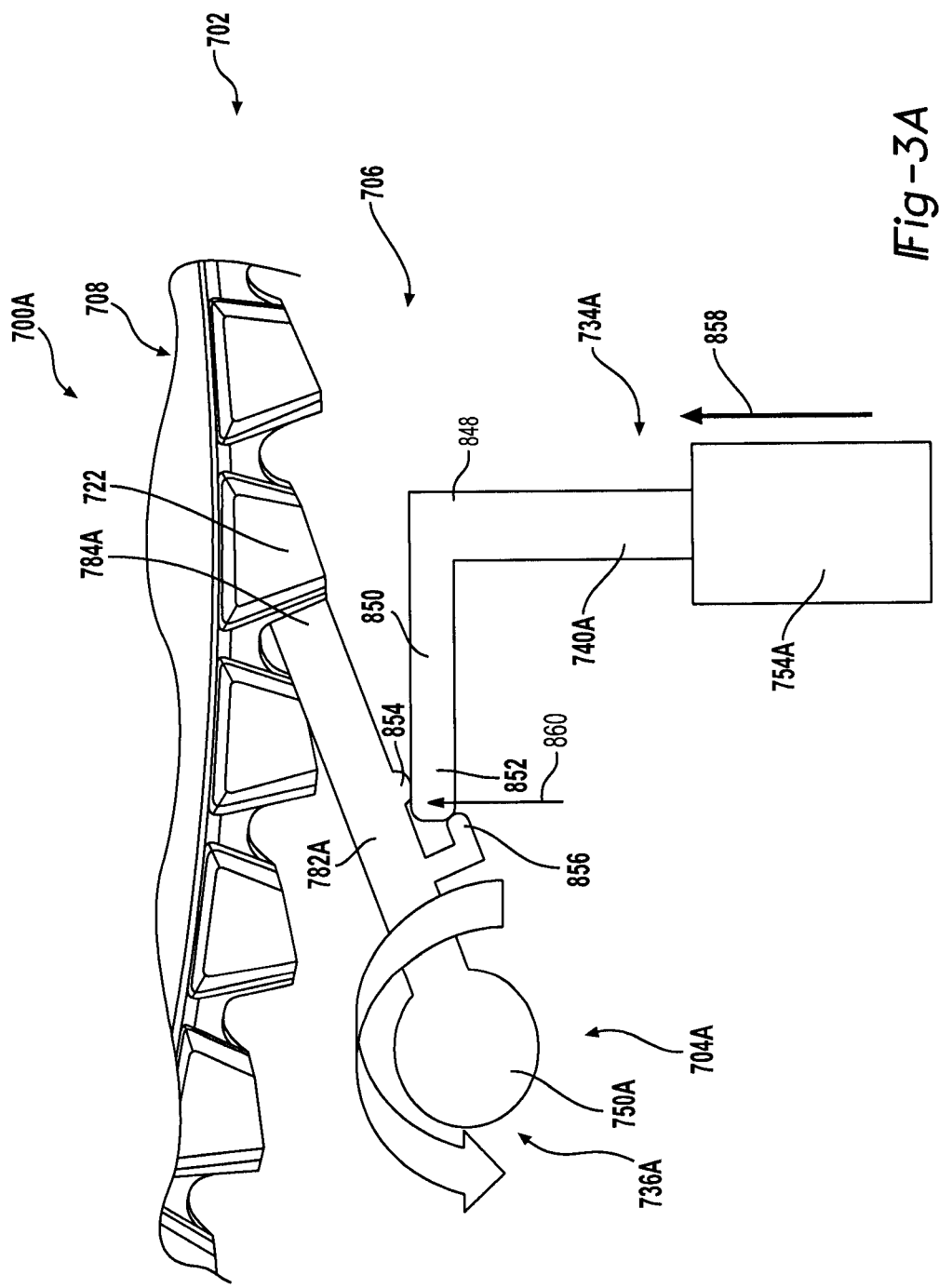

Referring now to FIGS. 3A and 3B, another alternative embodiment of an actuator module 704A is disclosed for use with a clutch module 702 within a controllable one-way clutch assembly 700A. Actuator module 704A also includes an electromagnetic actuator 734A configured as a solenoid actuator. This direct strut actuation arrangement is configured to employ a linearly-moveable actuation member 740A to move an active strut 736A between its deployed (FIG. 3A) and non-deployed (FIG. 3B) positions. As seen, solenoid actuator 734A includes coil assembly 754A in addition to linearly-moveable actuation member 740A. Actuation member 740A is configured to include a plunger 848 and an actuation flange 850 having a tip end segment 852 engaging a pair of pivot lugs 854, 856 formed on a strut segment 782A of active strut 736A. Arrow 858 indicates translational movement of moveable plunger 848 from a first (retracted) position to a second (extended) position in response to energization of coil assembly 754A. This action results in an actuation force, as indicated by arrow 860, acting on deployment pivot lug 854 for causing active strut 736A to pivot about pivot post segment 780A from its non-deployed position to its deployed position, whereby tip end segment 784A of active strut 736A engages one of ratchet teeth 722 on inner race 708.

In contrast, FIG. 3B illustrates operation of actuator module 704A when coil assembly 754A is de-energized. This de-energization causes a plunger return spring, not shown but indicated by arrow 862, to move plunger 848 back to its retracted position. As a result of retraction of plunger 848, tip end segment 852 of actuation flange 850 engages return pivot lug 856 on active strut 736A. This action results in a return force, as indicated by arrow 864, acting on strut 736A and causing strut 736A to pivot about its pivot post segment 780A to its non-deployed position. In addition, end segment 852 continues to engage return pivot lug 856 along the force line 864, which acts as a locking interface, so as to mechanically hold strut 736A in its non-deployed position and inhibit unintentional deployment of active strut 736A when coil assembly 754A is non-energized. Arrow 865 illustrates an active strut spring acting directly on active strut 736A for normally biasing active strut 736A toward its non-deployed position.

Figure 4:
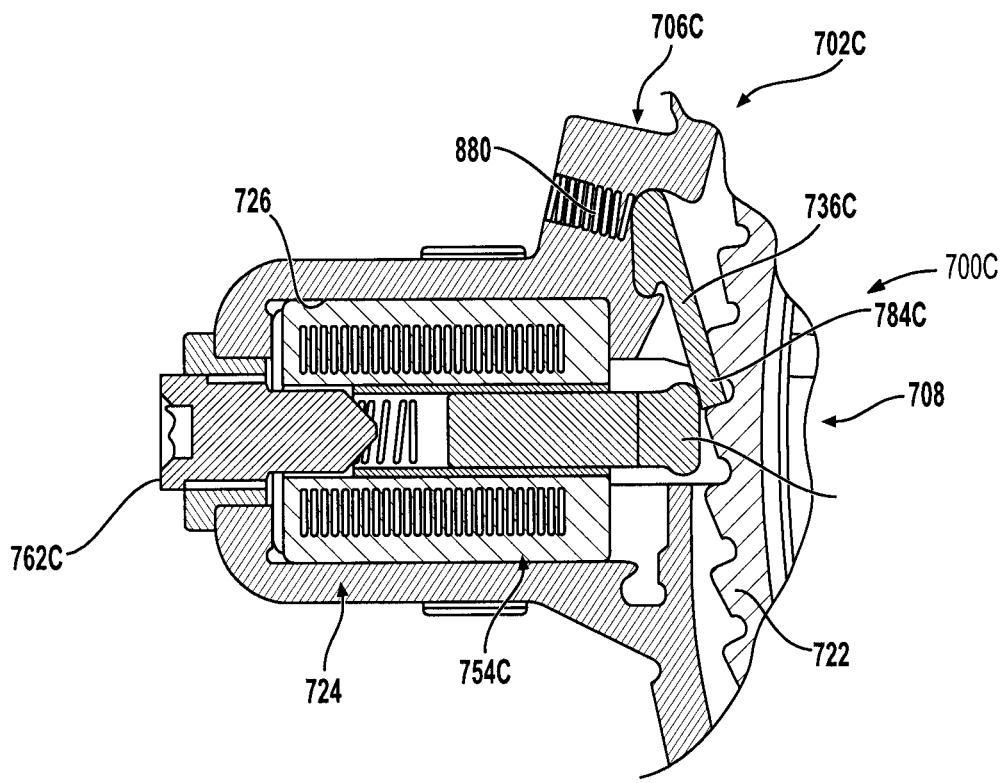
FIG. 4 is a side sectional view of another alternative embodiment of an actuator module adapted for use with a controllable one-way clutch and including a direct strut actuation arrangement with a moveable plunger of a solenoid actuator being operable to directly engage and move a strut from a released/non-deployed position to a locked/deployed position in response to energization of the solenoid actuator.

FIG. 4 illustrates another alternative embodiment of an actuator module 704C configured for use in cooperation with a clutch module 702C within a one-way clutch assembly 700C. In this arrangement a direct strut actuation arrangement is established between a linearly-moveable actuation member or plunger 740C and an active strut 736C. Plunger 740C is shown in an extended position relative to a stationary pole piece 762C in response to energization of a coil assembly 754C. This movement of plunger 740C from a retracted position to its extended position acts to forcibly pivot active strut 736C from its non-deployed position to its deployed position (shown), in opposition to the biasing of an active strut return spring 880, until its engagement end section 784C is engaged with one of ratchet teeth 722 on inner race 708. The magnetic field generated upon energization of coil assembly 754C is amplified by a shortened version of stationary pole piece 762C which results in an increased engagement force exerted by plunger 740C on strut 736C. Strut 736C returns to its non-deployed position once coil assembly 754C is deactivated due to the biasing force applied thereto via active strut spring 880.

Figure 5:
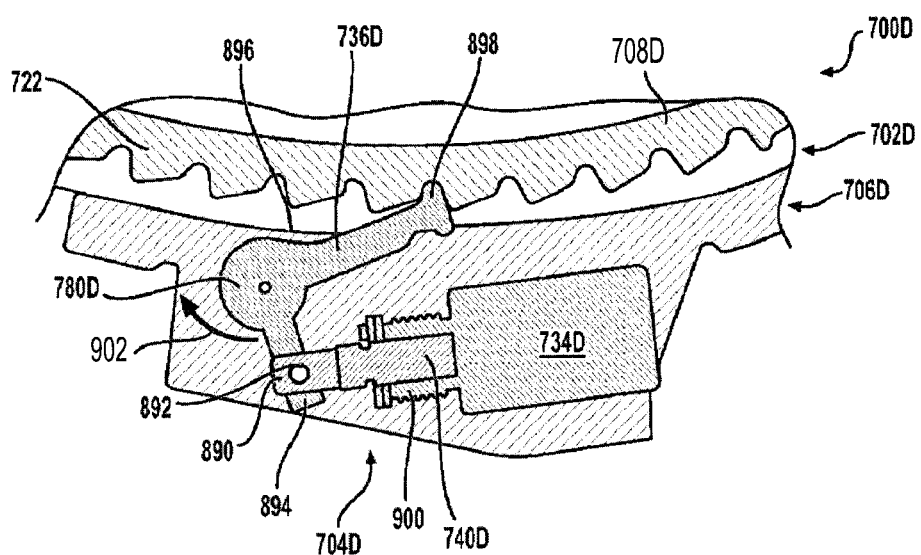
FIG. 5 illustrates yet another alternative embodiment of an actuator module adapted for use in a controllable one-way clutch and having a solenoid actuator, an active strut, and a direct strut actuation arrangement.

Referring now to FIG. 5, yet another alternative embodiment is shown for an electromagnetic actuator module 704D configured for use with a clutch module 702D within a controllable one-way clutch 700D. This direct strut actuation arrangement aims to provide improved strut motion and actuation forces by implementing a simpler strut geometry that only pivots about a load bearing area. Strut actuation is provided by a pull-type solenoid actuator 734D having a linearly-moveable plunger 740D with sufficient travel to ensure that active strut 736D pivots fully between its released/non-deployed and locked/deployed positions. A strut spring 902 functions to return active strut 736D to its released position following deactivation solenoid actuator 734D. The arrangement also employs active strut 736D having a modified locking tip profile adapted to interact with ratchet teeth 722 on inner race 708D. The modified locking tip profile acts to reject active strut 736D out of engagement with ratchet teeth 722 if strut is not positioned deep enough in the tooth valley. The depth of strut position in the tooth valley is dependent on relative speed between the strut and the inner race and the spring force.

As noted, FIG. 5 illustrates actuator module 704D to include solenoid actuator 734D with linearly-moveable plunger 740D. Terminal end 890 of plunger 740D is fixed via an articulating joint coupling 892 to a first leg segment 894 of active strut 736D which extends outwardly from a pivot post segment 780D that is pivotably supported by outer race 706D. A second leg segment 896 of strut 736D defines a revised tip end 898. Spring 900 acts between the solenoid housing and plunger 740D. Actuation of solenoid 734D acts to retract (pull-in) plunger 740D, in opposition to spring 900, for pivoting active strut 736D to the locked position shown. Arrow 902 schematically indicates the biasing provided by an active strut spring. The "line of action" associated with solenoid actuator 734D is again shown to be transversely aligned relative to the pivot axis of active strut 736D.

Figure 6:
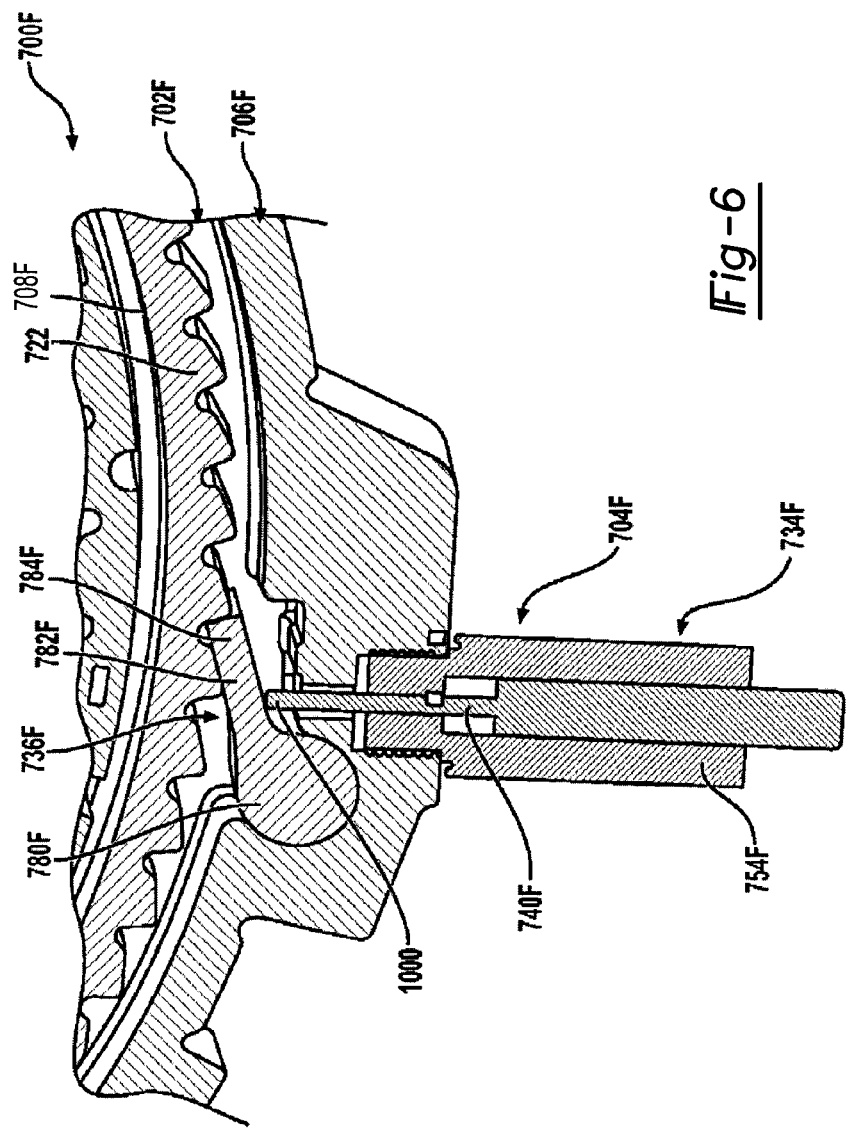
FIGS. 6-8 illustrate yet another alternative embodiment of an actuator module adapted for use in a controllable one-way clutch and having a solenoid actuator, an active strut, and a direct strut actuation arrangement.
Figure 7:
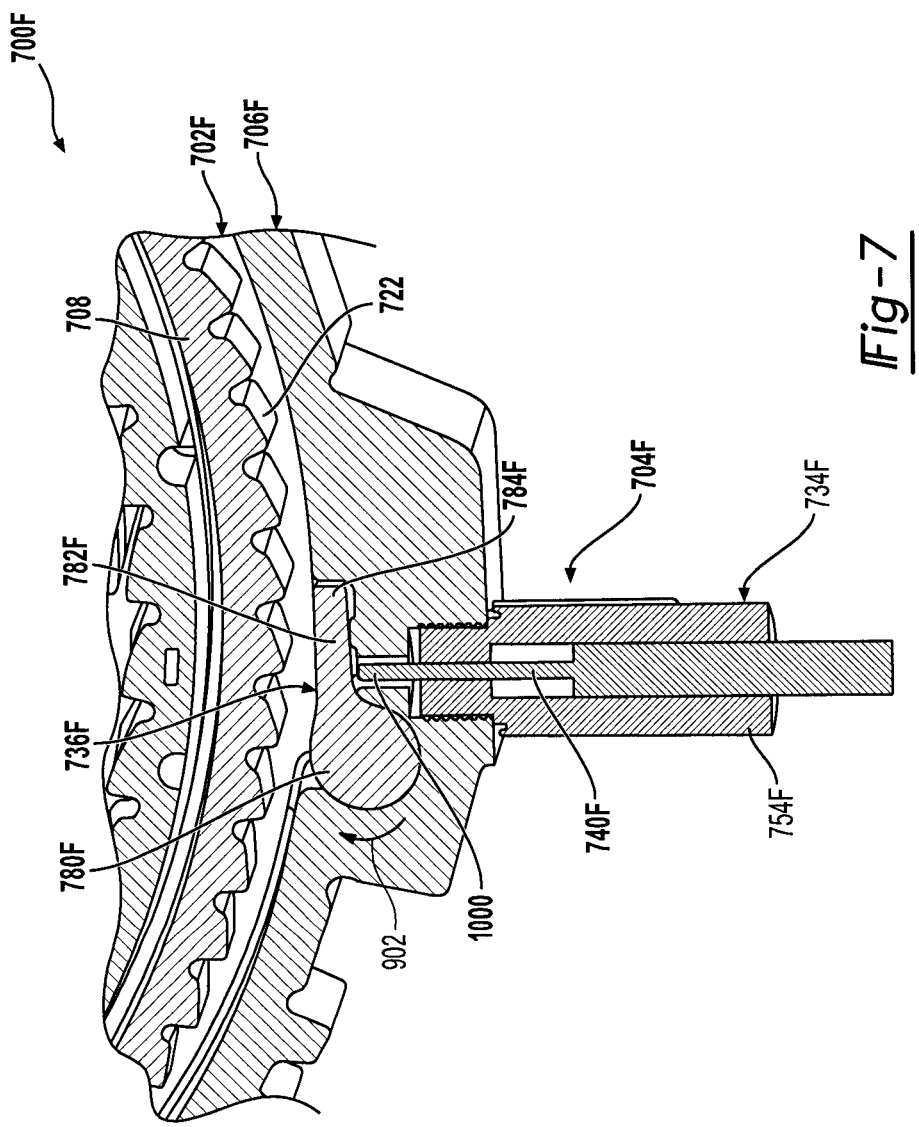
Figure 8:
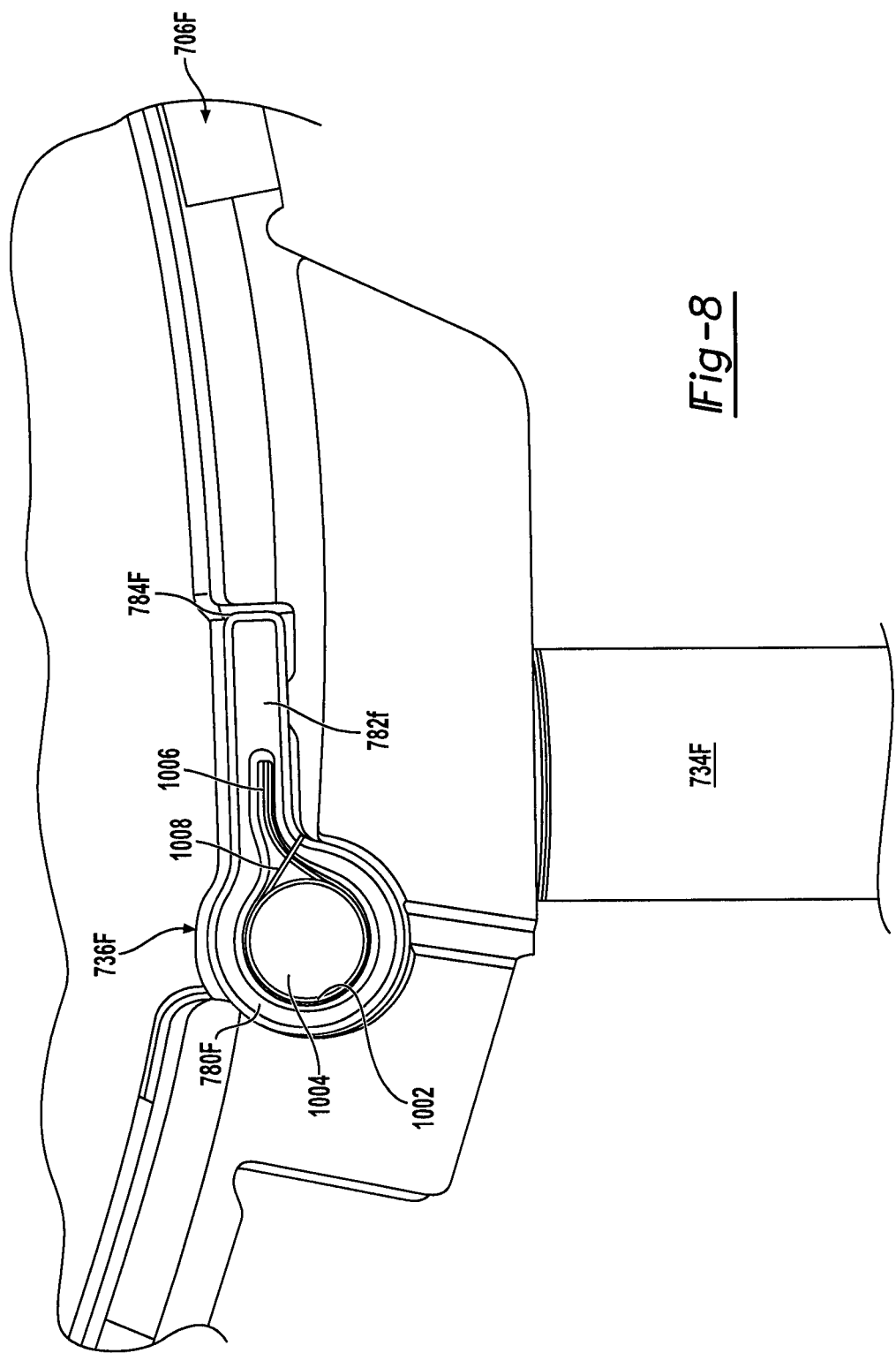

Referring now to FIGS. 6-8, yet another alternative embodiment is shown for an electromagnetic actuator module 704F configured for use with a clutch module 702F within a controllable one-way clutch 700F. This direct-acting strut actuation arrangement may be useful when a pull-type solenoid (e.g., pull-type solenoid actuator 734D shown in FIG. 6) cannot be packaged. This arrangement employs a solenoid actuator (i.e., push solenoid) 734F including coil assembly 754F with a linearly-moveable plunger 740F (i.e., push solenoid) extending radially outwardly from inner race 708F and outer race 706F of clutch module 702F to move active strut 736F between its deployed (FIG. 6) and non-deployed (FIG. 7) positions in response to controlled energization of coil assembly 754F. As seen, linearly-moveable plunger 740F has an end segment 1000 for engaging strut segment 782F of active strut 736F. Movement of linearly moveable plunger 740F to an extended position (FIG. 7) results in an actuation force being exerted on an underside strut segment 782F for causing active strut 736F to pivot about pivot post segment 780F to its deployed position with its end segment 784F engaged with one of ratchet teeth 722 on inner race 708.

FIG. 7 illustrates operation of actuator module 704F when coil assembly 754F of solenoid actuator 734F is de-energized. This de-energization allows strut spring 902 to cause active strut 736F to pivot about pivot post segment 780F to its non-deployed position with its end segment 784F disengaged with ratchet teeth 722 on inner race 708.

As best shown in FIG. 8, active strut 736F defines a spring pocket 1002 with a circular portion 1004 disposed in pivot post segment 780F and a tang retention portion 1006 extending therefrom into the strut segment 782F. Active strut spring 902 is shown as a torsion-type spring 1008 having a coiled section surrounding circular portion 1004 of spring pocket 1002 and a pair of tang sections. A first tang section extends into tang retention portion 1006 of spring pocket 1002 and a second tang section is retained in a slot (not shown) formed on outer race 706F of active strut 736F. The angle between the slot formed in outer race 706F and tang retention portion 1006 ensures a preload which can be tuned according to different inputs. This way, linearly-moveable plunger 740F and active strut 736F only need to make contact in the engagement direction (i.e., to move active strut 736F to its deployed position). Active strut 736F returns to its tucked-in or non-deployed position under its spring action of torsion-type spring 1008. Linearly moveable plunger 740F returns to its power-off or disengaged position under the force of its own internal spring (not shown).

Figure 9:
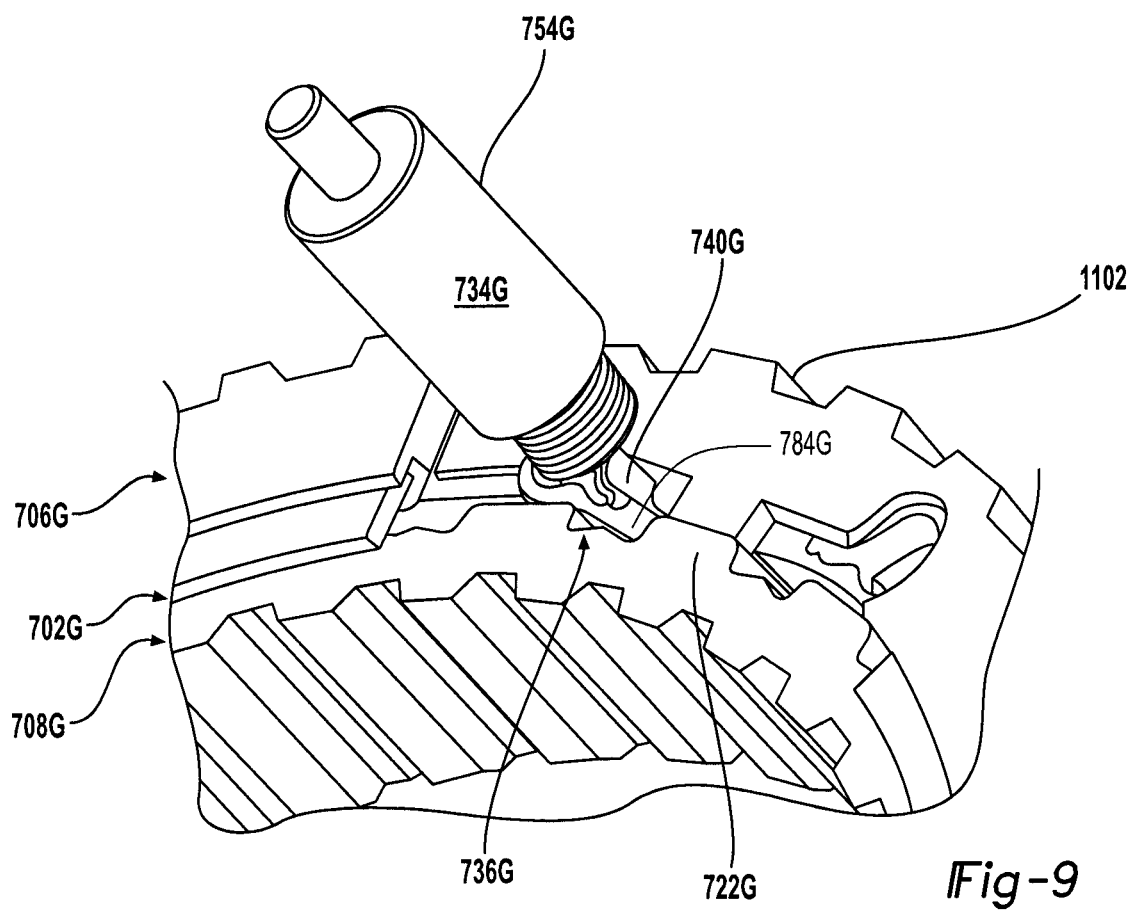
FIGS. 9 and 10 illustrate still another alternative embodiment of an actuator module adapted for use in a controllable one-way clutch and having a solenoid actuator, an active strut, and a direct strut actuation arrangement.
Figure 10:
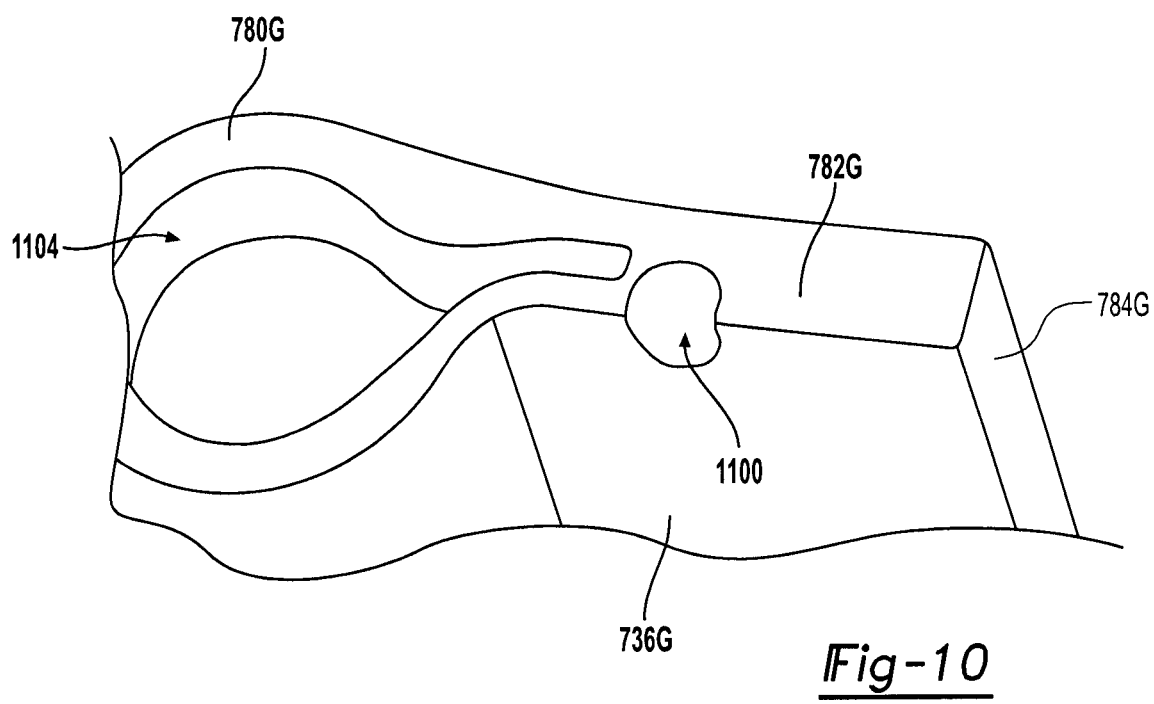

Referring now to FIGS. 9 and 10, another alternative version of an actuator module 704G configured for use with a clutch module 702G within a controllable clutch 700G is disclosed to utilize another direct strut actuation arrangement. In this version, electromagnetic actuator 734G is a solenoid actuator having a coil assembly 754G with a linearly-moveable plunger 740G aligned to extend axially from outer race 706G of clutch module 702G to move active strut 736G between its deployed (FIG. 9) and non-deployed (not shown) positions in response to energization of coil assembly 754G. Thus, the "line of action" for solenoid actuator 734G is parallel to the pivot axis of active strut 736G. Active strut 736G defines a plunger ramp 1100 (FIG. 10) on a side portion of strut segment 782G. Linearly-moveable plunger 740G has an end segment 1102 configured for engaging plunger ramp 1100 on strut segment 782G. Linear movement of plunger 740G from a retracted position to an extended position results in an actuation force being exerted on plunger ramp 1100 of strut segment 782G for causing active strut 736G to pivot about pivot post segment 780G to its deployed position with its end segment 784G engaged with one of ratchet teeth 722G formed on inner race 708G. Because plunger ramp 1100 of strut segment 782G is sloped or angled (i.e., includes a suitable inclined feature), linear movement of plunger 740G to its extended position causes its end segment 1102 to engage plunger ramp 1100 and forcibly displace active strut 736G about pivot post segment 780G. Linearly-moveable plunger 740G is positioned strategically in between a hard stop or non-deployed position of the active strut 736G. As a result, the linearly-moveable plunger 740G wedges itself between the housing (i.e., outer race 706G) and active strut 736G to rotate active strut 736G out of its non-deployed position and into its deployed position. As linearly-moveable plunger 740G is retracted (when coil assembly 754G is de-energized), a torsion-type spring (e.g., torsion-type spring 1008 shown in FIG. 8) disposed in spring pocket 1104 of active strut 736G acts to return active strut 736G to its non-deployed position.

The previous illustrations disclose several alternative embodiments of controllable one-way clutches equipped with a clutch module and at least one actuator module having a power-operated actuator configured to move a pivotable strut between first and second positions in response to actuation of the power-operated actuator either directly (i.e. the direct strut actuation arrangements) or indirectly (i.e., the indirect strut actuation arrangements). In some embodiments, a magnetic circuit was utilized to control movement of a magnetic strut (i.e., direct) or of a magnetic armature (i.e., indirect) for shifting of the controllable one-way clutch between its freewheeling and locked modes. In other embodiments, both the direct and indirect strut actuation arrangements utilized a linearly-moveable plunger of a solenoid actuator to control movement of a non-magnetic strut for shifting the controllable one-way clutch between its freewheeling and locked modes. While these alternative embodiments have proven successful in commercial applications within motor vehicles, the following disclosure is related to an advanced solenoid-actuated indirect strut actuation arrangement configured to provide increased actuation forces, reduced solenoid plunger travel requirements, reduced strut friction, enhanced packaging optimization and reduced assembly complexity. Accordingly, with attention now directed FIGS. 11 through 21, at least one non-limiting embodiment of an actuator module having a solenoid, an active strut, and an indirect strut actuation arrangement will be described in detail and which is operably configured to provide the above-noted advantages and advance the technological field of controllable one-way coupling devices.

Figure 11:
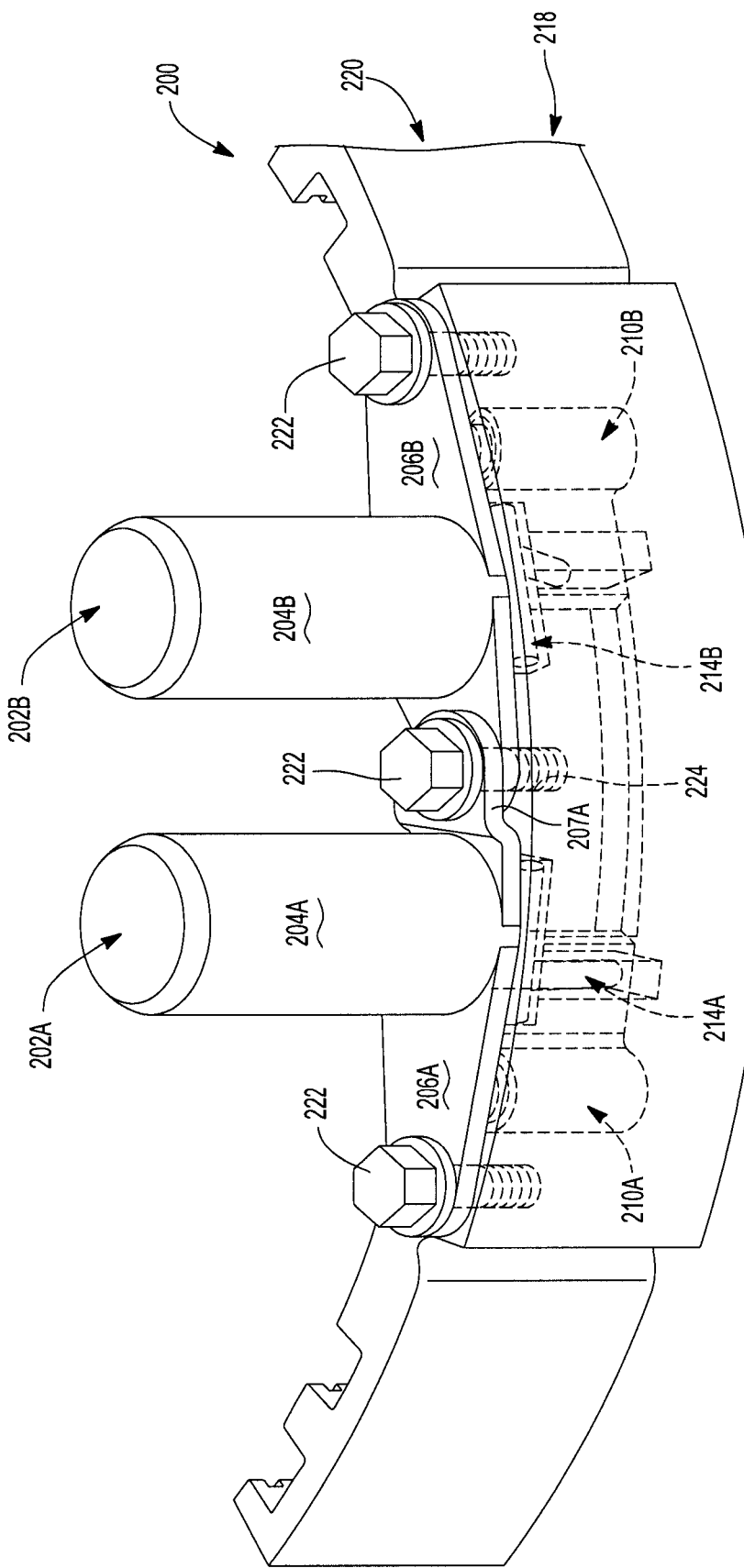
FIG. 11 is an isometric view of a portion of a controllable one-way clutch illustrating first and second actuator modules mounted to an outer race of a clutch module, with each actuator module having a solenoid actuator, an active strut, and an indirect strut actuation arrangement disposed between the solenoid actuator and the active strut.

Referring initially to FIG. 11, a portion of a controllable one-way clutch 200 is shown to include a pair of actuator modules, namely a first actuator module 202A and a second actuator module 202B. For purposes of clarity, similar components will hereinafter be described and/or identified with the suffix "A" in association with first actuator module 202A and the suffix "B" in association with second actuator module 202B. First actuator module 202A is oppositely oriented with respect to second actuator module 202B, in this non-limiting configuration of controllable one-way clutch 200, such that first actuator module 202A provides freewheeling and locked modes of operation that are established in opposite rotary directions to the freewheeling and locked modes of operation provided by second actuator module 202B. Those skilled in the art will appreciate that first actuator module 202A or second actuator module 202B could be employed alone without the oppositely arranged other actuator module.

First actuator module 202A generally includes a first solenoid actuator 204A mounted to a first mounting bracket 206A and having a first linearly-moveable plunger 208A, a first active strut 210A, and a first indirect strut actuation arrangement 212A having a first actuation component 214A. First mounting bracket 206A is shown mounted to a side surface 216 of an outer race 218 associated with a clutch module 220 via threaded fasteners 222 that are screwed into threaded bores 224 formed in outer race 218. Similarly, second actuator module 202B includes a second solenoid actuator 204B mounted to a second mounting bracket 206B and having a second linearly-moveable plunger 208B, a second active strut 210B, and a second indirect strut actuation arrangement 212B having a second actuation component 214B. Second mounting bracket 206B is shown mounted to side surface 216 of outer race 218 via at least one additional threaded fasteners 222 secured in a corresponding threaded bores 224. In the non-limiting arrangement shown, first mounting bracket 206A includes an offset end segment 207A overlying an end portion of second mounting bracket 206B, with both connected via a common threaded fastener 222 to outer race 218.

Figure 16:
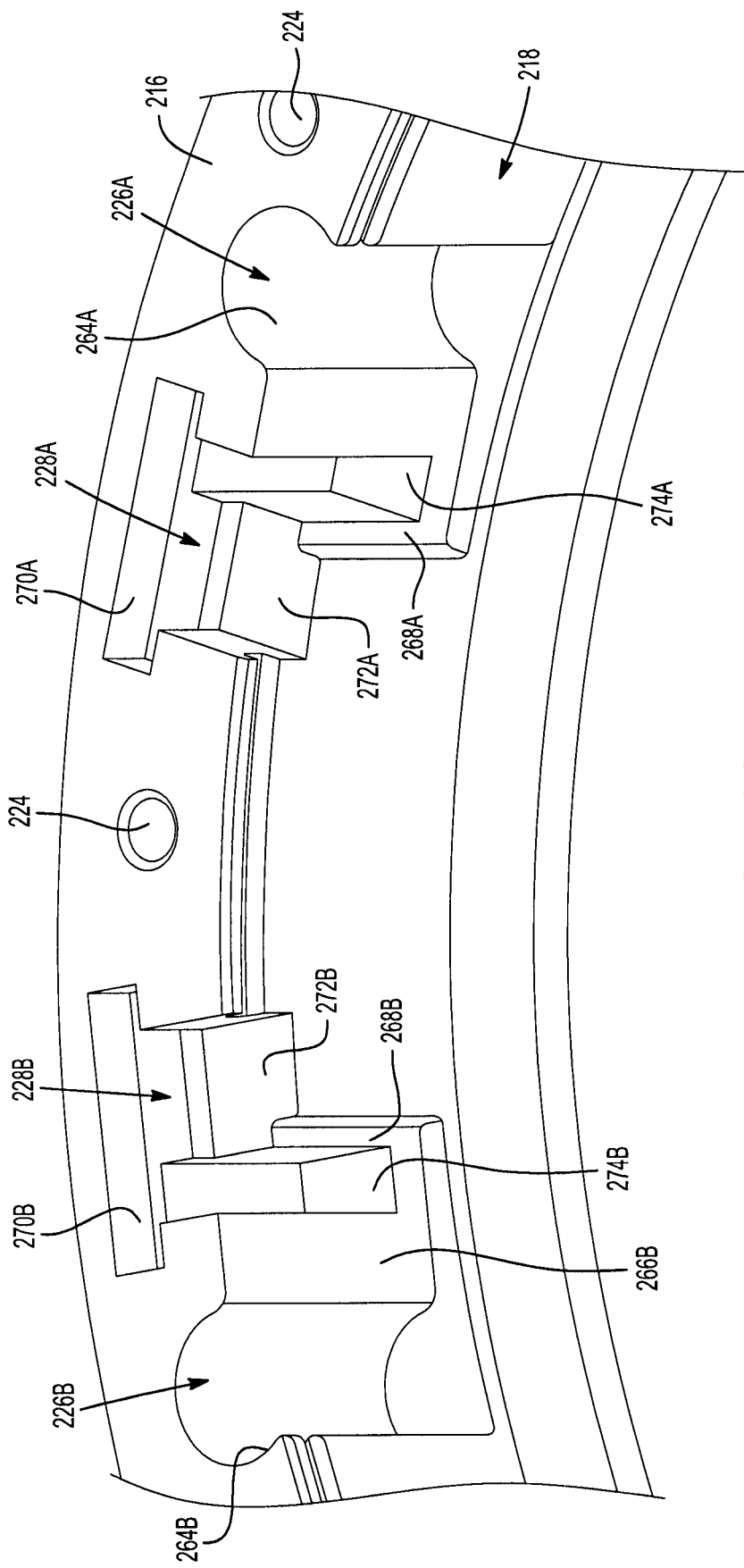
FIG. 16 is an isometric view of the outer race of the clutch module prior to assembly of the first and second actuator modules.

FIG. 16 best illustrates the portion of outer race 218 to which first actuator module 202A and second actuator module 202B are operably installed. A first strut pocket 226A is formed in outer race 218 to support first active strut 210A for pivotal movement between a non-deployed position and a deployed position. Likewise, a first actuation pocket 228A is formed in outer race 218 to support first actuation component 214A for pivotal movement between a non-actuated position and an actuated position. An engagement interface is established between first actuation component 214A and first active strut 210A. As such, when first actuation component 214A is located in its non-actuated position, first active strut 210A is located in it non-deployed position. In contrast, when first actuation component 214A is located in it actuated position, first active strut 210A is located in its deployed position. In addition, a coupling interface is established between first plunger 208A and first actuation component 214A. As such, translational movement of first plunger 208A between a first or "extended" position and a second or "retracted" position results in corresponding movement of first actuation component 214A between its non-actuated and actuated positions. A first active strut spring 230A (FIG. 12) is configured to normally bias first active strut 210A toward its non-deployed position. First active strut 210A is operable in its non-deployed position to be released from latched engagement with first ratchet teeth 232A (FIG. 12) formed on an inner race 234 associated with clutch module 220 to define the freewheeling mode. Likewise, first active strut 210A is operable in its deployed position to lockingly engage one of first ratchet teeth 232A formed on inner race 234 to define the locked mode.

A similar arrangement is provided in outer race 218 for supporting second active strut 210B within a second strut pocket 226B for pivotal movement between its non-deployed and deployed positions, and for supporting second actuation component 214B in a second actuation pocket 228B for pivotal movement between its non-actuated and actuated positions. Again, an engagement interface is established between second active strut 210B and second actuation component 214B. As such, locating second actuation components 214B in its non-actuated position causes second active strut 210B to be located in its non-deployed position. In contrast, movement of second actuation component 214B to its actuated position results in movement of second active strut 210B to its deployed position. A second active strut spring 230B (FIG. 12) is configured to normally bias second active strut 210B toward its non-deployed position. In addition, a coupling interface is established between second plunger 208B and second actuation component 214B. As such, movement of second plunger 208B between a first or "extended" position and a second or "retracted" position results in corresponding movement of second actuation component 214B between its non-actuated and actuated positions. Second active strut 210B is operable in its non-deployed position to be released from latched engagement with second ratchet teeth 232B (FIG. 12) formed on inner race 234 of clutch module 220 to define the freewheeling mode. Likewise, second active strut 210B is operable in its deployed position to lockingly engage one of second ratchet teeth formed on the inner race 234 to define the locked mode.

Figure 15:
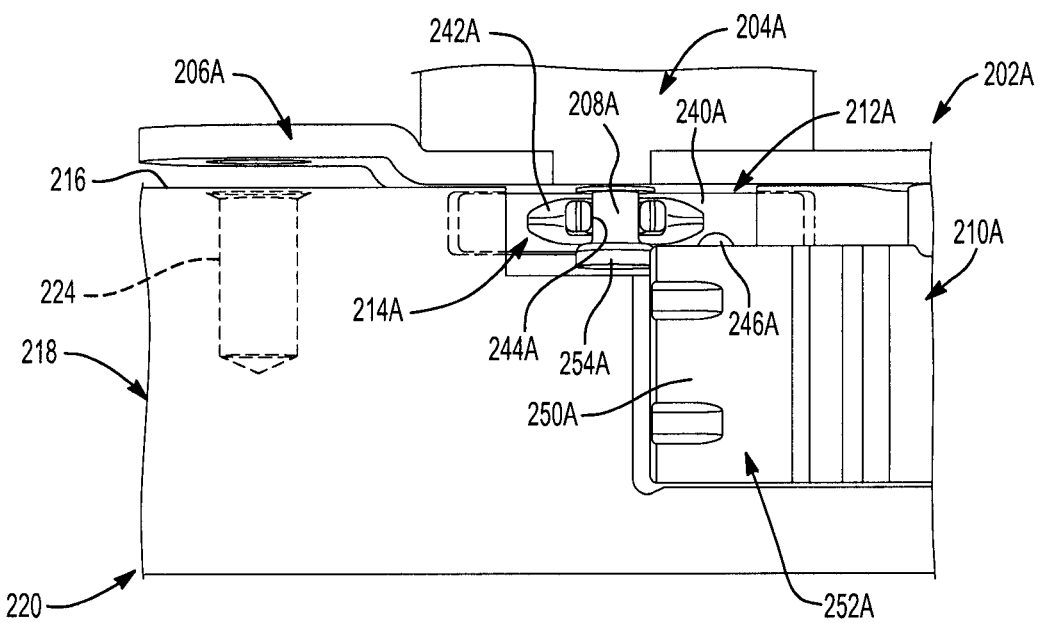
FIG. 15 is an inner isometric view of the first actuator module showing a coupling interface established between a first plunger of the first solenoid actuator and a first intermediate actuation component associated with the first indirect strut actuation arrangement.
Figure 18:
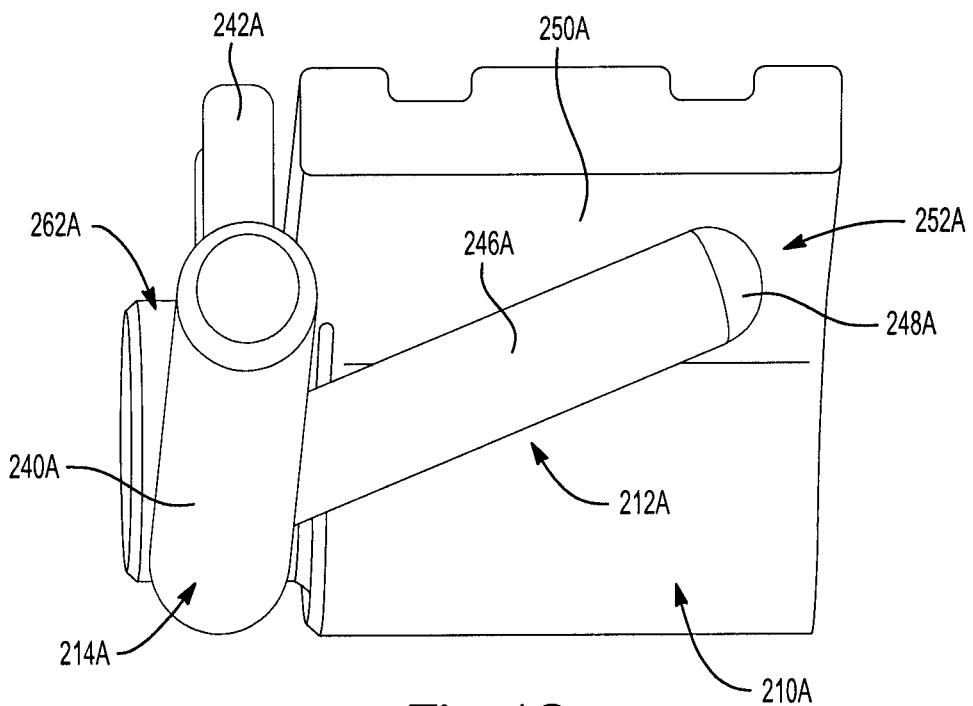
FIG. 18 is an isometric view illustrating the engagement interface established between the first active strut and the first intermediate actuation component associated with the first indirect strut actuation arrangement.
Figure 19:
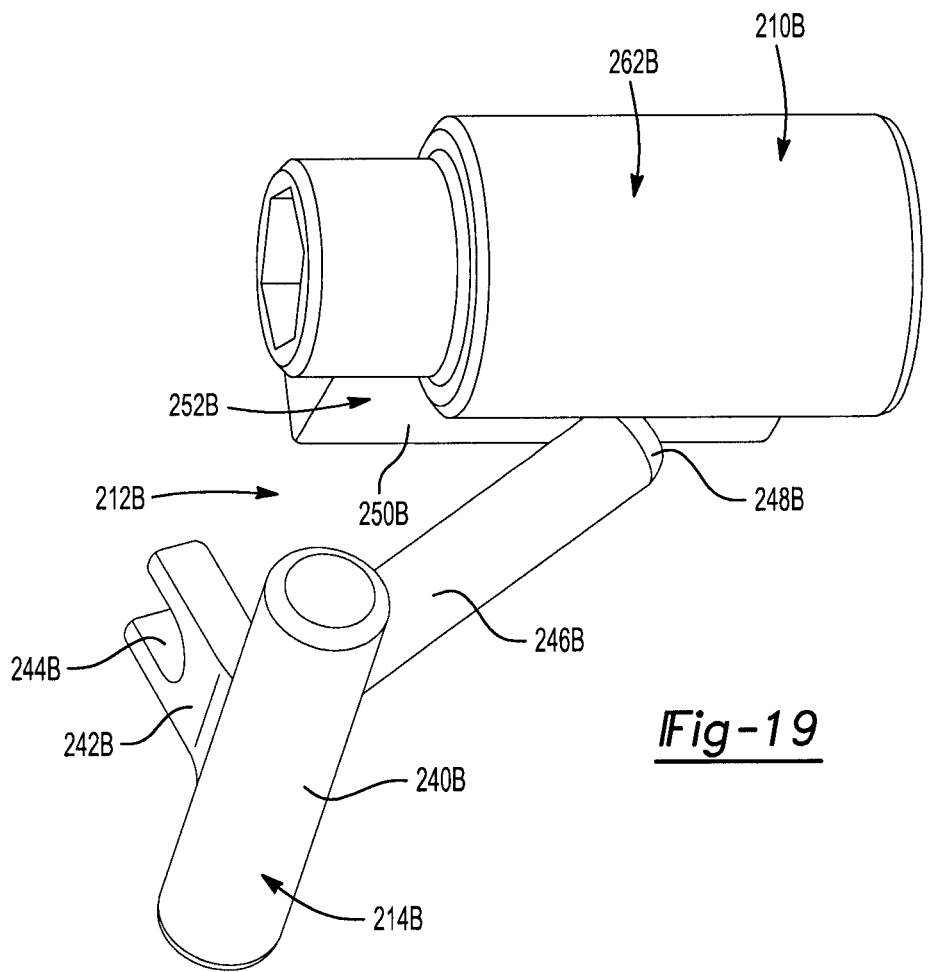
FIG. 19 is an isometric view of the engagement interface established between the second intermediate active strut and the second actuation component associated with the second indirect strut actuation arrangement.
Figure 20:
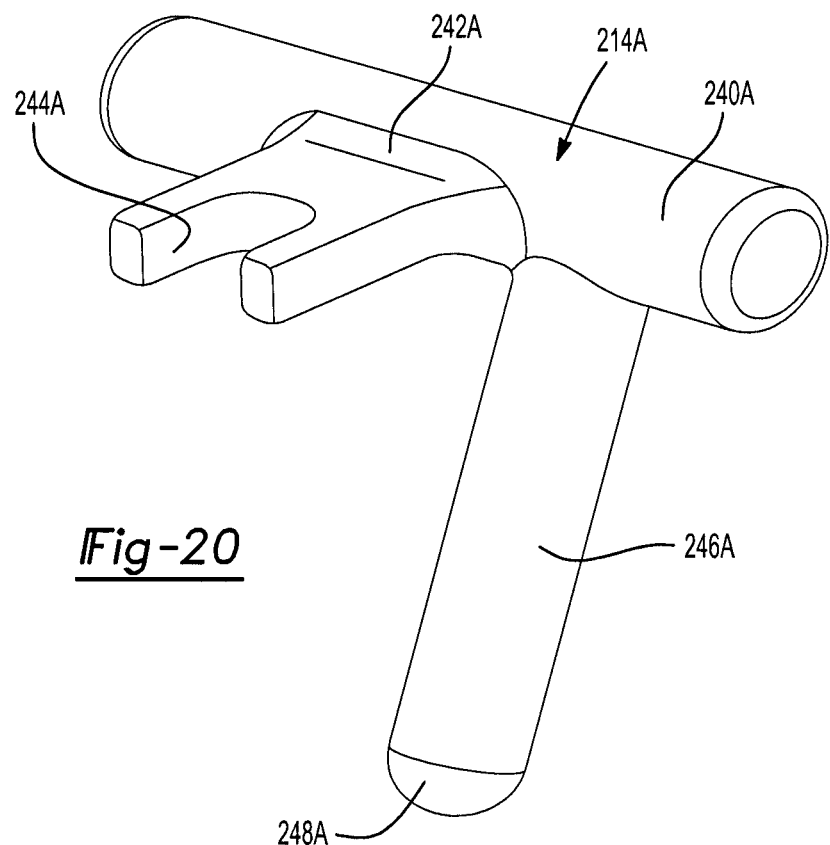
FIG. 20 is an isometric view of the intermediate first actuation component and FIG. 21 is an isometric view of the second intermediate actuation component.
Figure 21:
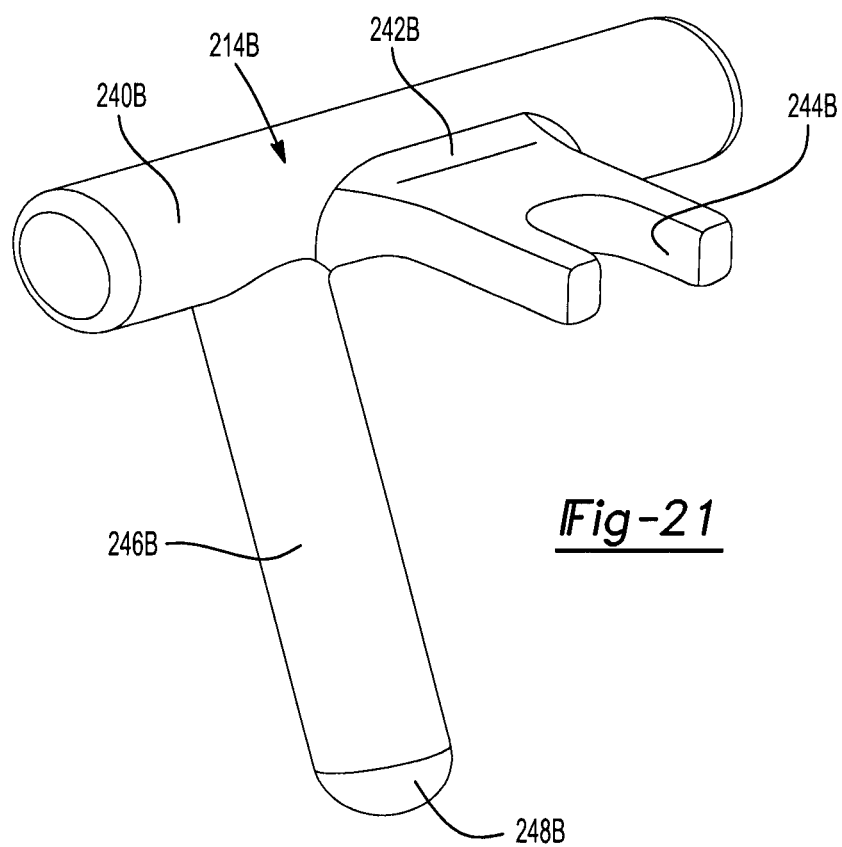

FIGS. 18 and 20 illustrate first actuation component 214A configured to generally include a cylindrical pivot post segment 240A, a forked lug segment 242A extending outwardly from pivot post segment 240A and defining a plunger retention aperture 244A, and an actuation lug segment 246A also extending outwardly from pivot post segment 240A and having an engagement tip portion 248A oriented to selectively engage an engagement face surface 250A formed on an engagement segment 252A of first active strut 210A. FIG. 15 illustrates first plunger 208A extending through retention aperture 244A in forked lug segment 242A of first actuation component 214A and having a plunger coupler lug 254A configured to couple forked lug segment 242A to first plunger 208A. The angular relationship between forked lug segment 242A and actuation lug segment 246A is shown, in this non-limiting embodiment, to be less than 90° with respect to the pivot axis of pivot post segment 240A of first actuation component 214A. However, this angular orientation can be easily modified to accommodate different coupling and engagement arrangements between first actuation component 214A and first plunger 208A and first active strut 210A. FIG. 21 illustrates the similar features associated with second actuation component 214B and which are identified with a common reference number and the corresponding "B" suffix.

Figure 17:
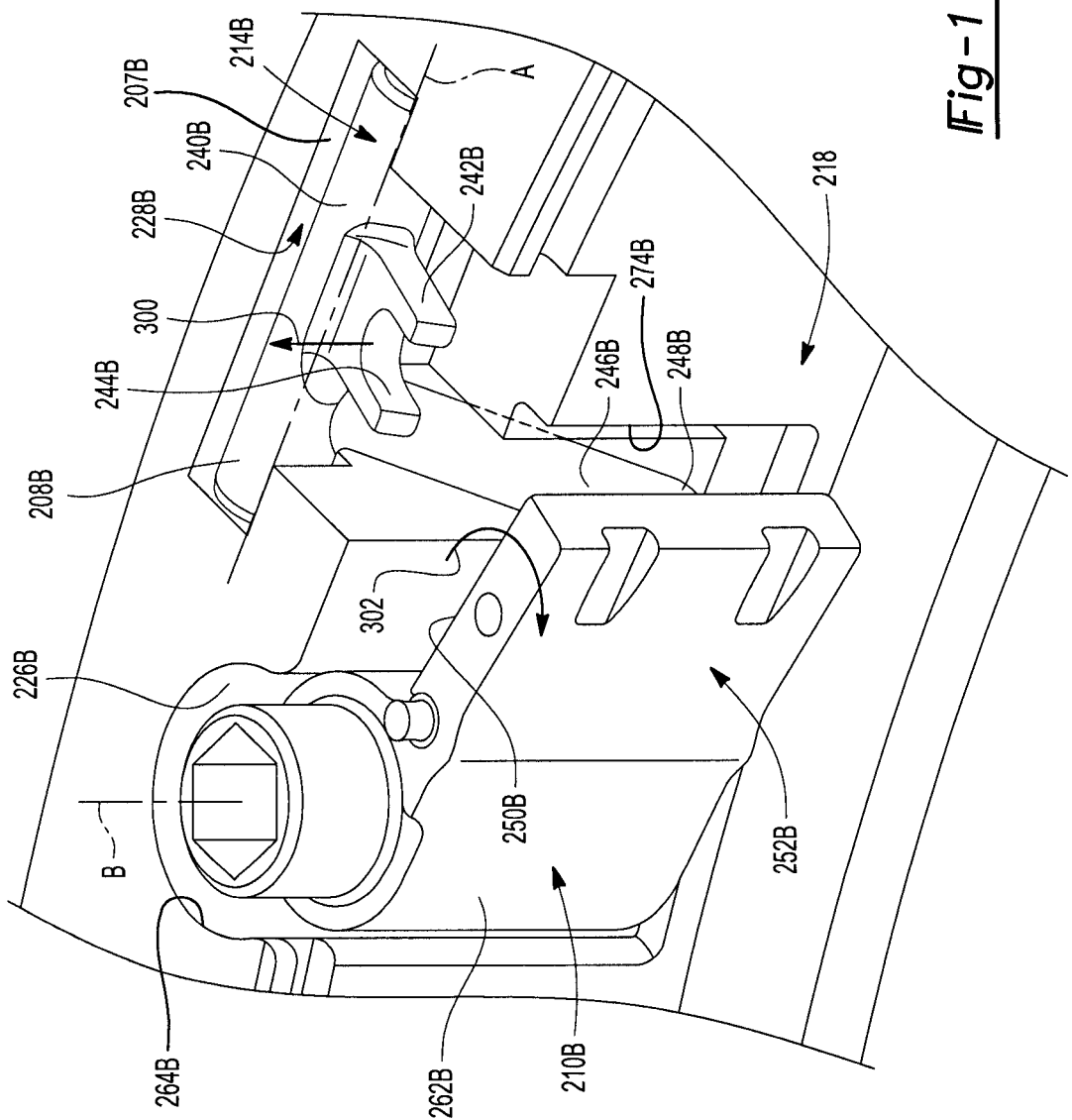
FIG. 17 is an isometric view of the second actuator module illustrating a second active strut and a second intermediate actuation component associated with the second indirect strut actuation arrangement, as installed in the outer race of the clutch module.

Referring to FIGS. 16 and 17, further details as to preferred pivotal mounting of second active strut 210B and second actuation component 214B within their respective strut and actuation pockets 226B and 228B will now be provided. A pivot boss segment 262B of second active strut 210B is shown disposed in a pivot pocket portion 264B of strut pocket 252B while engagement segment 252B of second active strut 210B is shown disposed in strut engagement pocket portion 266B of strut pocket 226B. Second active strut 210B is shown in FIG. 17 pivoted to its deployed position. When second active strut 210B is located in its non-deployed position, face surface 250B of engagement segment 252B abuts a stop shoulder 266B in strut pocket 226B. Pivot post segment 240B of second actuation component 214B is shown disposed in a pivot post portion 270B of actuation pocket 228B. Forked lug segment 242B of second actuation component 214B is shown aligned with a first lug portion 272B of actuation pocket 228B. In addition, actuation lug segment 246B is shown disposed within a second lug portion 274B of actuation pocket 228B. These pockets support second actuation member 214B for pivotal movement about an axis "A" between its non-actuated and actuated positions while supporting second active strut 210B for pivotal movement about an axis "B" between its non-deployed and deployed position.

As seen from FIGS. 12-15 and 17; first actuator module 202A is shown operating in a non-energized (i.e. power-off) state with first plunger 208A being located in its extended position (FIG. 15), first actuation component 214A being located in its non-actuated position, and first active strut 210A being located in its non-deployed position. In contrast, second actuator module 202B is shown operating in an energized (i.e. power on) state with second plunger 208B moved from its extended position to its retracted position via actuation of second solenoid actuator 204B such that the coupled interface between second plunger 208B and second actuation component 214B causes corresponding pivotal movement of second actuation component 214B from its non-actuated position into its actuated position. This pivotal movement of second actuation component 214B, in turn, causes pivotal movement of second active strut 210B from its non-deployed position to its deployed position due to tip portion 248B of actuation lug segment 246B engaging and acting on engagement face surface 250B of second active strut 210B. A solenoid return spring (not shown) associated with each solenoid actuator 204A, 204B acts to normally bias its corresponding plunger 208A, 208B toward its extended position upon de-energization of solenoid actuator 204A, 204B. As previously noted, strut return springs 230A, 230B, associated with each of first and second active struts 210A, 210B, each normally function to bias its corresponding active strut toward its non-deployed position. While solenoid actuators 204A, 204B are configured as "pull-type" power-operated devices for pivoting corresponding actuation components 214A, 214B from their non-actuated position into their actuated position, those skilled in the art will recognize that the present disclosure also contemplates use of modified actuation components in association with "push-type" solenoid actuators. In such push-type solenoid actuators, movement of the plunger from a retracted (solenoid off) position to an extended (solenoid on) position would facilitate movement of the actuation component from its non-actuated position to its actuated position.

The present disclosure provides a way to effectively "decouple" the active strut from the solenoid plunger such that solenoid mounting arrangements are not limited, and the actuator force generated by the solenoid actuator may be optimized due to the mechanical advantage provided by the indirect strut actuation arrangement shown in FIGS. 12-20. The solution provided by the present disclosure generally involves adding an intermediate actuation component that is capable of pivoting about its own axis and which has a first lug providing a coupling interface with the solenoid plunger and a second lug providing an engagement interface with the active strut. When the first lug is moved upwardly via retraction of the plunger via solenoid actuation, an actuation force (see arrow 300 of FIG. 17) causes the actuation component to pivot about the "A" axis. Due to this pivotal movement, the second lug engages the active strut and forcibly pivots the active strut about the "B" axis from its non-deployed position into its deployed position, in opposition to the biasing of the strut return spring, as indicated by arrow 302. When the solenoid is powered off, the plunger returns to its extended position, due to the internal plunger return spring, which causes the actuation component to pivot back to its non-actuated position, whereby the strut return spring is permitted to forcibly drive the active strut back to its non-deployed position.

Because the actuation component is configured with two distinct lug features in two different positions, the solenoid location relative to the active strut can be remote, unlike the previously disclosed direct strut actuation arrangements. In addition, since the length of the two lug features, and the angulation therebetween, can be significantly different, these dimensional relationships reduce the required plunger travel which is crucial in maintaining a compact solenoid design. A further advantage is the alignment of the plunger's line of translational travel in parallel to the pivot axis of the strut. This parallel mounting arrangement, best show in FIG. 12, significantly reduces radial packaging requirement in comparison to traditional top and side mounted solenoids.

Figure 12:
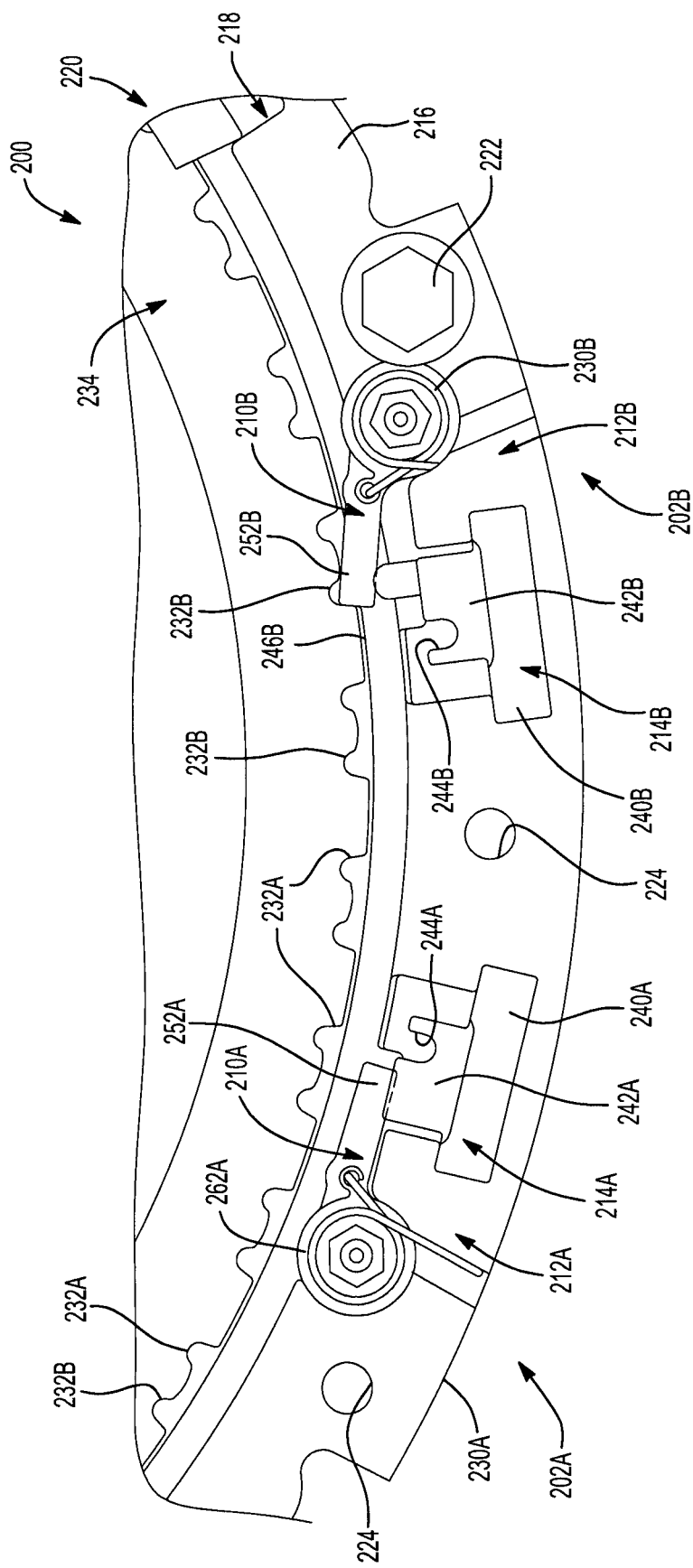
FIGS. 12 and 13 are side views of the controllable one-way clutch shown in FIG. 11 with various components removed to better illustrate an engagement interface established between the active strut and an intermediate actuation component associated with the indirect strut actuation arrangement for each of the first and second actuator modules.
Figure 13:
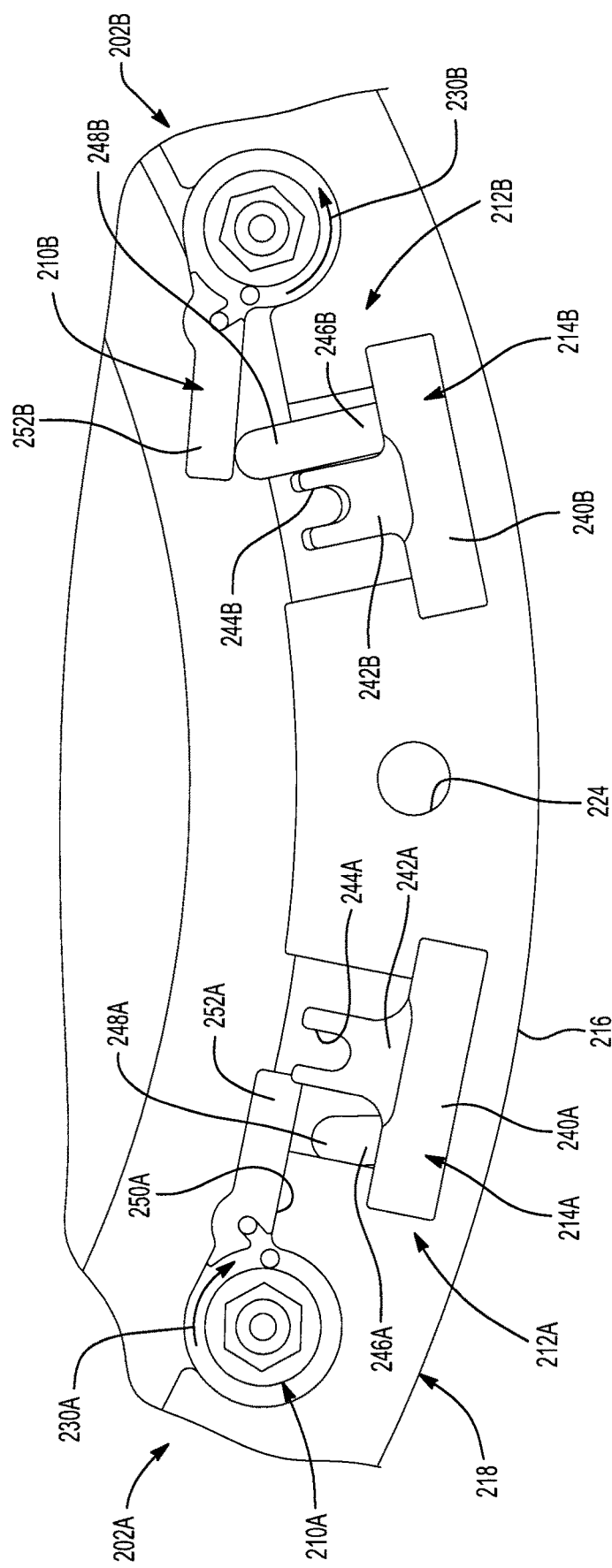
Figure 14:
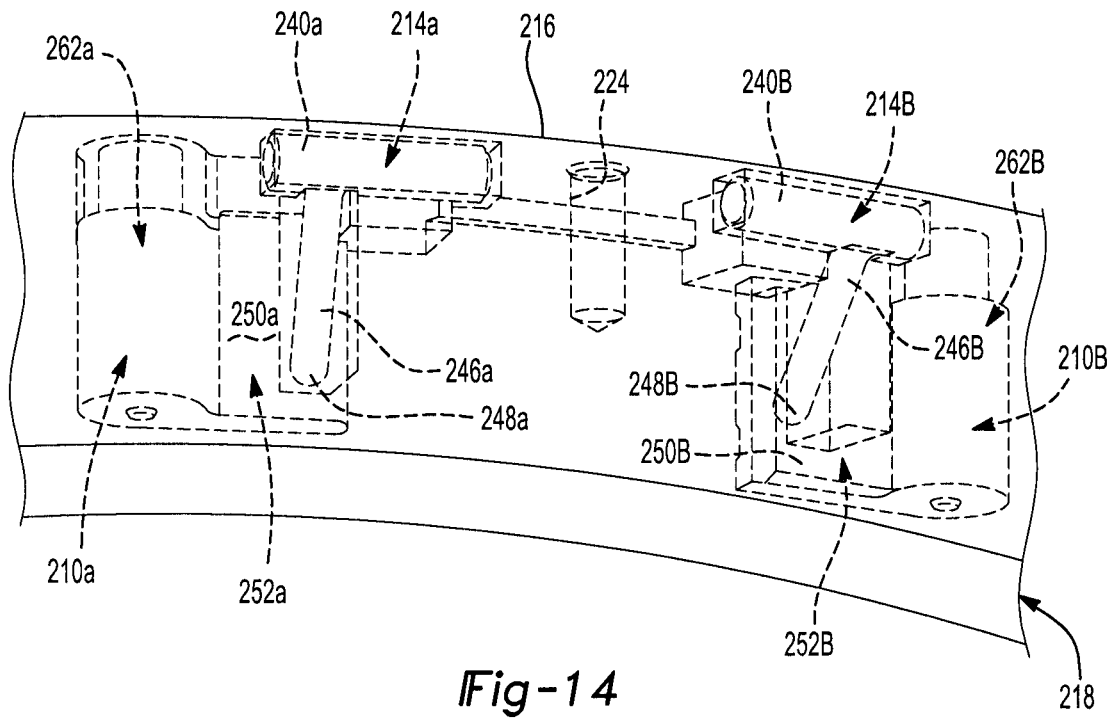
FIG. 14 is an outer end isometric view of the arrangement shown in FIG. 13, with portions of the outer race of the clutch module shown transparently, illustrating the engagement interface established between the active strut and the intermediate actuation component associated with the indirect strut actuation arrangement for each of the first and second actuator modules.

It should be noted that controllable one-way clutch 200, best shown in FIGS. 12 and 13A provide several available operating modes depending on the actuated state of each of solenoids 204A, 204B. These modes include: A) a freewheeling mode in both direction (both solenoids off); B) a first one-way locked mode (first solenoid on—second solenoid off); C) a second one-way locked mode (first solenoid off—second solenoid on); and D) a two-way locked mode (both solenoids on). Note that the dual ratchet tooth 232A, 232B configuration on inner race 234 provides these alternative modes, as well as permitting ratcheting in the freewheel directions. However, this dual controllable one-way clutch configuration is non-limiting and only illustrated for purposes of providing those skilled in the art an understanding of one advantageous embodiments. That said, clutch module 220 can easily be modified to work in association with only one of first actuator module 202A or second actuator module 202B as an alternative to that specifically shown and described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A one-way coupling device, comprising:
a clutch module including a first clutch component, and a second clutch component arranged for rotation relative to the first clutch component and having ratchet teeth; and
an actuator module mounted to the first clutch component and including a solenoid actuator with a plunger moveable between first and second positions, a strut moveable between a non-deployed position disengaged from latched engagement with the ratchet teeth and a deployed position in latched engagement with the ratchet teeth, a strut biasing member for normally biasing the strut toward its non-deployed position, and an indirect strut actuation arrangement having an actuation component moveable between non-actuated and actuated positions, the actuation component defining a coupling interface with the plunger and an engagement interface with the strut;
wherein movement of the plunger from its first position to its second position in response to actuation of the solenoid actuator causes the actuation component to move from its non-actuated position into its actuated position which concomitantly causes the strut to move from its non-deployed position into its deployed position;
wherein the strut is mounted in a strut pocket formed in the first clutch component for pivotal movement about a strut pivot axis, wherein the actuation component is mounted in an actuation pocket formed in the first clutch component for pivotal movement about an actuation pivot axis, and wherein the strut pivot axis is aligned to be generally orthoganal to the actuation pivot axis.

2. The one-way coupling device of claim 1, wherein the first position of the plunger is an extended position and the second position of the plunger is a retracted position, and wherein the solenoid actuator further includes a plunger spring for normally biasing the plunger toward its extended position.

3. The one-way coupling device of claim 1, wherein the plunger is linearly-moveable between its first and second positions along a line of translational travel that is oriented to extend generally parallel to the strut pivot axis.

4. The one-way coupling device of claim 1, wherein the actuator module further includes a mounting bracket mounted to a side surface of the first clutch component and which is configured to enclose at least a portion of the actuation pocket and the strut pocket, and wherein the solenoid actuator is secured to the mounting bracket such that an end portion of the plunger extends through the mounting bracket and is engaged by the coupling interface of the actuation component.

5. The one-way coupling device of claim 4, wherein the solenoid actuator is secured to the mounting bracket so as to extend axially from the side surface of the first clutch component such that the plunger moves between its first and second positions along a line of translational travel that is aligned to be generally parallel to the strut pivot axis.

6. The one-way coupling device of claim 1, wherein the actuation component includes a pivot boss segment disposed in the actuation pocket for pivotal movement about the actuation pivot axis, a first lug segment coupled to the plunger to define the coupling interface, and a second lug segment engaging the strut to define the engagement interface with the strut.

7. The one-way coupling device of claim 6, wherein the first lug segment is a forked lug extending from the pivot boss segment and adapted to retain an end portion of the plunger, and wherein the second lug segment is an elongated actuation lug extending from the pivot boss segment and having a tip portion engaging an engagement face surface of the strut.

8. The one-way coupling device of claim 7, wherein the actuation lug is longer than the forked lug.

9. The one-way coupling device of claim 7, wherein the forked lug is angularly displaced relative to the actuation lug by an angle that is less than 90°.

10. The one-way coupling device of claim 7, wherein movement of the plunger from its first position to its second position causes the coupled interface with the forked lug to pivot the actuation component from its non-actuated position to its actuated position which in turn causes the actuation lug to drive the strut from its non-deployed position into its deployed position.

11. The one-way coupling device of claim 1, wherein the actuation component includes a first lug segment coupled to the plunger to define the coupling interface and a second lug segment engaging an engagement surface on the strut to define the engagement interface, and wherein movement of the plunger from its first position to its second position in response to energization of the solenoid actuator causes the coupling interface to pivot the actuation component about its actuation pivot axis from its non-actuated position into its actuated position such that the engagement interface causes the second lug segment of the actuation component to drive the strut from its non-deployed position into its deployed position in opposition to the biasing exerted on the strut by the strut biasing member.

12. The one-way coupling device of claim 11, wherein the first lug segment is a forked lug configured to be coupled to an end portion of the plunger, and wherein the second lug segment has a tip portion engaging the engagement surface on the strut.

13. The one-way coupling device of claim 11, wherein the first position of the plunger is an extended position and the second position is a retracted position, and wherein the plunger is normally biased to its extended position.

14. The one-way coupling device of claim 11, wherein the first position of the plunger is a retracted position and the second position is an extended position, and wherein the plunger is normally biased toward its retracted position.

15. A one-way coupling device, comprising:
a clutch module having a first clutch component, and a second clutch component arranged for rotation relative to the first clutch component and having ratchet teeth; and
an actuator module mounted to the first clutch component and including a solenoid actuator with a plunger moveable between first and second positions, a strut moveable between a non-deployed position disengaged from the ratchet teeth and a deployed position engaged with the ratchet teeth, a strut biasing member for biasing the strut toward its non-deployed position, and an indirect strut actuation arrangement having an actuation component moveable between non-actuated and actuated positions, the actuation component defining a coupling interface with the plunger and an engagement interface with the strut,
wherein the actuation component is mounted to the first clutch component for pivotal movement about an actuation pivot axis and includes a forked lug segment coupled to the plunger to define the coupling interface and an actuation lug segment having a tip portion engaging an engagement surface on the strut to define the engagement interface, wherein movement of the plunger from its first position to its second position in response to actuation of the solenoid actuator causes the forked lug segment to pivot the actuation component about its actuation pivot axis from its non-actuated position into its actuated position which concomitantly causes the actuation lug segment to drive the strut from its non-deployed position into its deployed position in opposition to the biasing of the strut biasing member.

16. The one-way coupling device of claim 15, wherein the strut is mounted in a strut pocket formed in the first clutch component for pivotal movement about a strut pivot axis, wherein the actuation component is mounted in an actuation pocket formed in the first clutch component for pivotal movement about its actuation pivot axis, wherein the strut pivot axis is aligned to be transversely oriented relative to the actuation pivot axis, and wherein the plunger moves between its first and second positions along a line of translational travel that is aligned to be parallel relative to the strut pivot axis.

17. The one-way coupling device of claim 16, wherein the actuator module further includes a mounting bracket adapted to be fixed to a side surface of the first clutch component and configured to retain the strut with the strut pocket and retain the actuation component within the actuation pocket, wherein the solenoid actuator is secured to the mounting bracket so as to extend axially relative to the first clutch component, and wherein the plunger extends through the mounting bracket and is coupled to the forked lug segment of the actuation component.

18. A one-way coupling device, comprising:
   a clutch module including an outer clutch component, and an inner clutch component arranged coaxially for rotation relative to the outer clutch component and having an outer surface formed with ratchet teeth; and
   an actuator module mounted to the outer clutch component and including a solenoid actuator having a plunger moveable between first and second positions, a strut moveable between a non-deployed position disengaged from the ratchet teeth and a deployed position engaged with the ratchet teeth, and an indirect strut actuation arrangement disposed between the plunger and the strut and having an actuation component moveable between a non-actuated position and an actuated position, the actuation component defining a coupling interface with the plunger and an engagement interface with the strut such that movement of the plunger from its first position to its second position in response to actuation of the solenoid actuator causes movement of the actuation component from its non-actuated position to its actuated position which causes movement of the strut from its non-deployed position to its deployed position,
   wherein the outer clutch component includes a lateral side surface defining a strut pocket for supporting the strut for pivotal movement between its first and second positions about a strut pivot axis, and an actuation pocket for supporting the actuation component for pivotal movement between its non-actuated and actuated positions about an actuation pivot axis, wherein a mounting bracket is fixed to the lateral side surface of the outer clutch component and is configured to retain the strut within the strut pocket and retain the actuation component within the actuation pocket, and wherein the solenoid actuator is secured to the mounting bracket such that the plunger is connected via the coupling interface of the actuation component and is arranged to move between its first and second positions along a line of translational travel that is generally parallel to the strut pivot axis.

19. The one-way coupling of claim 18, wherein the strut pivot axis is aligned transversely with respect to the actuation pivot axis, and wherein the actuation component has a first lug segment configured to be connected to the plunger and define the coupling interface and a second lug segment configured to engage the strut and define the engagement interface.

\* \* \* \* \*